(12) United States Patent
Iinuma

(10) Patent No.: US 11,025,822 B2
(45) Date of Patent: Jun. 1, 2021

(54) IMAGING APPARATUS AND CONTROL METHOD FOR IMAGING APPARATUS

(71) Applicant: SONY CORPORATION, Tokyo (JP)

(72) Inventor: Takahiro Iinuma, Kanagawa (JP)

(73) Assignee: SONY CORPORATION, Tokyo (JP)

(*) Notice: Subject to any disclaimer, the term of this patent is extended or adjusted under 35 U.S.C. 154(b) by 44 days.

(21) Appl. No.: 16/320,199

(22) PCT Filed: May 16, 2017

(86) PCT No.: PCT/JP2017/018270
§ 371 (c)(1),
(2) Date: Jan. 24, 2019

(87) PCT Pub. No.: WO2018/025465
PCT Pub. Date: Feb. 8, 2018

(65) Prior Publication Data
US 2019/0268532 A1 Aug. 29, 2019

(30) Foreign Application Priority Data
Aug. 1, 2016 (JP) ............................. JP2016-150946

(51) Int. Cl.
*H04N 5/232* (2006.01)
*G06K 9/00* (2006.01)
(Continued)

(52) U.S. Cl.
CPC ..... *H04N 5/23245* (2013.01); *G06K 9/00771* (2013.01); *H04N 5/232* (2013.01);
(Continued)

(58) Field of Classification Search
None
See application file for complete search history.

(56) References Cited

U.S. PATENT DOCUMENTS

| 5,955,753 A | 9/1999 | Takahashi |
| 2006/0238621 A1* | 10/2006 | Okubo ............... H04N 5/23258 348/208.99 |

(Continued)

FOREIGN PATENT DOCUMENTS

| CN | 10130449 | 11/2008 |
| JP | H09-046596 | 2/1997 |

(Continued)

OTHER PUBLICATIONS

International Search Report prepared by the Japan Patent Office dated Aug. 10, 2017, for International Application No. PCT/JP2017/018270.

(Continued)

*Primary Examiner* — Kaitlin A Retallick
(74) *Attorney, Agent, or Firm* — Sheridan Ross P.C.

(57) ABSTRACT

The power consumption is reduced in an imaging apparatus that detects the presence or absence of an event. In a pixel array unit, a plurality of transfer transistors that transfer charges from mutually different photoelectric conversion devices to a floating diffusion layer is provided. A scan circuit simultaneously controls the plurality of transfer transistors in a pixel addition mode in which pixel addition is performed, to transfer the charges and sequentially controls the plurality of transfer transistors in a normal mode in which pixel addition is not performed, to transfer the charges. An event detection unit detects the presence or absence of a predetermined event on the basis of an addition signal which is an analog signal generated in the normal mode, and generates a detection result. A mode control unit sets one of the pixel addition mode and the normal mode on the basis of the detection result.

12 Claims, 18 Drawing Sheets

(51) Int. Cl.
*H04N 5/347* (2011.01)
*H04N 5/376* (2011.01)
*H04N 5/374* (2011.01)

(52) U.S. Cl.
CPC ......... *H04N 5/23218* (2018.08); *H04N 5/347* (2013.01); *H04N 5/374* (2013.01); *H04N 5/376* (2013.01)

(56) References Cited

U.S. PATENT DOCUMENTS

| | | |
|---|---|---|
| 2008/0284871 A1 | 11/2008 | Kobayashi |
| 2012/0008032 A1* | 1/2012 | Kurihara .............. H04N 5/3598 348/308 |
| 2013/0088608 A1 | 4/2013 | Kobayashi |
| 2014/0118592 A1 | 5/2014 | Yoon et al. |
| 2014/0132785 A1 | 5/2014 | Kobayashi |
| 2015/0296113 A1 | 10/2015 | Kobayashi |
| 2015/0319341 A1* | 11/2015 | Sekine .................. H04N 5/144 348/64 |
| 2016/0165100 A1 | 6/2016 | Kobayashi |

FOREIGN PATENT DOCUMENTS

| | | |
|---|---|---|
| JP | 2004-274533 | 9/2004 |
| JP | 2006-197192 | 7/2006 |
| JP | 2010-171666 | 8/2010 |
| JP | 2013-115793 | 6/2013 |
| KR | 10-2015-0099716 | 9/2015 |

OTHER PUBLICATIONS

Official Action (with English translation) for Chinese Patent Application No. 2017800362555, dated Nov. 24, 2020, 20 pages.
Official Action (with English translation) for Korea Patent Application No. 10-2019-7002469, dated Feb, 13, 2021, 9 pages.

* cited by examiner

FIG. 7

| MODE SIGNAL MODE | DETECTION RESULT DET | COUNTER VALUE CNT | ACTION OF MODE SIGNAL GENERATION UNIT |
|---|---|---|---|
| 0 (PIXEL ADDITION MODE) | 0 (THERE IS NO EVENT) | — | — |
| | 1 (THERE IS EVENT) | — | CNT←0 MODE←1 (SHIFT TO NORMAL MODE) |
| 1 (NORMAL MODE) | — | CNT<N | — |
| | — | CNT≥N | MODE←0 (SHIFT TO PIXEL ADDITION MODE) | a b

IMAGING APPARATUS AND CONTROL METHOD FOR IMAGING APPARATUS

CROSS REFERENCE TO RELATED APPLICATIONS

This application is a national stage application under 35 U.S.C. 371 and claims the benefit of PCT Application No. PCT/JP2017/018270 having an international filing date of 16 May 2017, which designated the United States, which PCT application claimed the benefit of Japanese Patent Application No. 2016-150946 filed 1 Aug. 2016, the entire disclosures of each of which are incorporated herein by reference.

TECHNICAL FIELD

The present technology relates to an imaging apparatus and a control method for the imaging apparatus. In detail, the present technology relates to an imaging apparatus and a control method for the imaging apparatus that detect the presence or absence of an event such as movement of a subject.

BACKGROUND ART

Conventionally, imaging apparatuses that detect the presence or absence of an event such as movement of a subject by an image process are widely utilized in fields such as measurement, traffic, and crime prevention. For example, there has been proposed an imaging apparatus that captures a plurality of pieces of image data (frames) at a constant imaging interval and detects the presence or absence of an event from a difference between the integral value of the luminance of the current frame and the integral value of the luminance of the past frame (see, for example, Patent Document 1). This imaging apparatus is used for, for example, an application that does not record a frame in a memory until an event occurs and starts recording of a frame when an event occurs to save the memory capacity, or the like.

CITATION LIST

Patent Document

Patent Document 1: Japanese Patent Application Laid-Open No. 2004-274533

SUMMARY OF THE INVENTION

Problems to be Solved by the Invention

In the imaging apparatus described above, from the viewpoint of enhancing the image quality of the frame, frames are captured without pixel addition before and after the event detection. However, when imaging is performed without pixel addition, there is a difficulty that the number of times of analog-to-digital (AD) conversion increases and the power consumption grows large as compared with the case of pixel addition. If the resolution of the frame is lowered by pixel addition, the number of times of AD conversion can be made smaller to reduce power consumption, but it is undesirable because the image quality of the frame to be recorded after event detection deteriorates.

The present technology has been created in view of such a situation and it is an object of the present technology to reduce power consumption in an imaging apparatus that detects the presence or absence of an event.

Solutions to Problems

The present technology has been made in order to eliminate the above-mentioned difficulties and a first aspect thereof is an imaging apparatus and a control method therefor, the imaging apparatus including: a pixel array unit provided with a plurality of transfer transistors that transfer the charges from mutually different photoelectric conversion devices to a floating diffusion layer; a scan circuit that simultaneously controls the plurality of transfer transistors in a pixel addition mode in which pixel addition is performed, to transfer the charges, and sequentially controls the plurality of transfer transistors in a normal mode in which pixel addition is not performed, to transfer the charges; an event detection unit that detects presence or absence of a predetermined event on the basis of an addition signal which is an analog signal generated in the pixel addition mode, and generates a detection result; and a mode control unit that sets one of the pixel addition mode and the normal mode on the basis of the detection result. This brings about effectiveness that one of the pixel addition mode and the normal mode is set on the basis of the detection result for the event.

Furthermore, in this first aspect, an analog-to-digital conversion unit that performs analog-to-digital conversion on the addition signal to output as addition data may be further included. This brings about effectiveness that the addition signal is subjected to the analog-to-digital conversion.

Furthermore, in this first aspect, a predetermined number of the floating diffusion layers may be arranged in the pixel array unit, and an exposure control unit that controls an exposure amount of the pixel array unit on the basis of luminance integral data obtained by integrating the predetermined number of pieces of the addition data may be further included. This brings about effectiveness that the exposure amount is controlled on the basis of the luminance integral data.

Furthermore, in this first aspect, the event detection unit may detect presence or absence of movement of a subject as presence or absence of the predetermined event. This brings about effectiveness that one of the pixel addition mode and the normal mode is set on the basis of a detection result for the presence or absence of movement of the subject.

Furthermore, in this first aspect, the event detection unit may include: a luminance integral data holding unit that holds the luminance integral data as past integral data; and a movement detection unit that detects presence or absence of movement of the subject depending on whether or not a difference between new luminance integral data and the past integral data exceeds a predetermined threshold value. This brings about effectiveness that the presence or absence of movement of the subject is detected depending on the difference between the new luminance integral data and the past integral data.

Furthermore, in this first aspect, the event detection unit may further include: an addition data holding unit that holds the predetermined number of pieces of addition data as past addition data; and a difference acquisition unit that acquires a difference between new addition data and the past addition data corresponding to the new addition data and generates a weight according to the difference, and the luminance integral data may be a weighted addition value of the addition data and the weight corresponding to the addition data. This brings about effectiveness that the exposure amount is controlled on the basis of the weighted addition value of the addition data and the weight corresponding to the addition data.

Furthermore, in this first aspect, the pixel array unit may generate an image signal including the analog signal in the normal mode, and the mode control unit may set the normal mode in a case where it is detected that the predetermined event has occurred, and may set the pixel addition mode in a case where a certain number of the image signals are generated. This brings about effectiveness that the pixel addition mode is set in a case where a certain number of image signals are generated.

Furthermore, in this first aspect, the pixel array unit, the scan circuit, the event detection unit, and the mode control unit may be arranged in a solid-state imaging device. This brings about effectiveness that an event is detected by the solid-state imaging device.

Furthermore, in this first aspect, the pixel array unit and the scan circuit may be arranged in a solid-state imaging device, and the event detection unit and the mode control unit may be arranged outside the solid-state imaging device. This brings about effectiveness that an event is detected outside the solid-state imaging device.

Effects of the Invention

According to the present technology, it is possible to achieve an excellent effect that the power consumption can be reduced in an imaging apparatus that detects the presence or absence of an event. Note that the effects described herein are not necessarily limited and any effects described in the present disclosure may be applied.

BRIEF DESCRIPTION OF DRAWINGS

FIG. 7 is a diagram illustrating an example of the action of a mode signal generation unit according to the first embodiment of the present technology.

MODE FOR CARRYING OUT THE INVENTION

Modes for carrying out the present technology (hereinafter, referred to as embodiments) will be described below. The description will be given in the following order.

1. First Embodiment (an example in which pixel addition is performed until an event is detected)
2. Second Embodiment (an example in which pixel addition is performed until an event is detected by a DSP circuit)
3. Third Embodiment (an example in which pixel addition is performed until an event is detected and an area where a subject has moved is intensively photometered)

1. First Embodiment

[Configuration Example of Imaging Apparatus]

Figure 1:
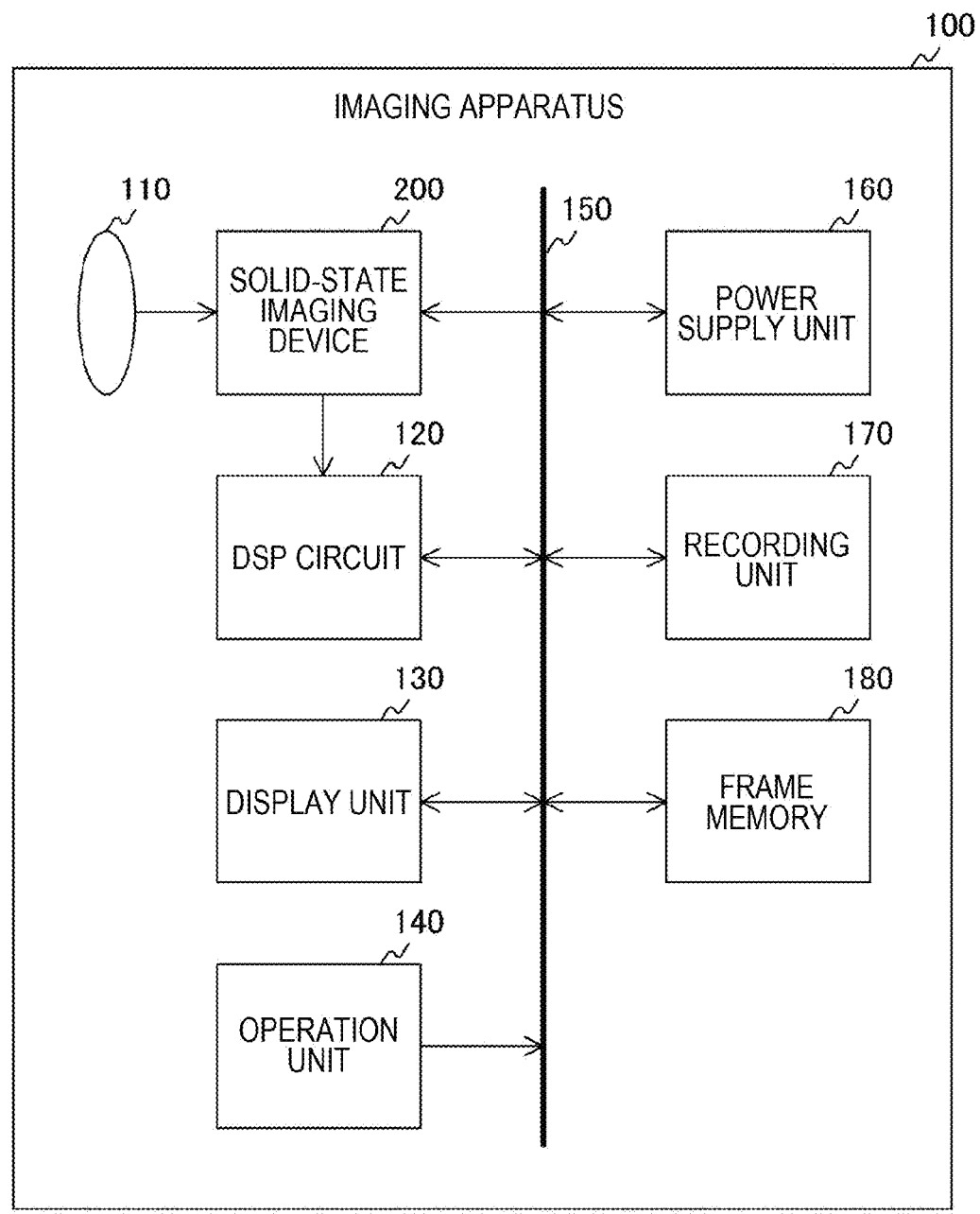
FIG. 1 is a block diagram illustrating a configuration example of an imaging apparatus according to a first embodiment of the present technology.

FIG. 1 is a block diagram illustrating a configuration example of an imaging apparatus 100 according to a first embodiment of the present technology. This imaging apparatus 100 includes an optical unit 110, a solid-state imaging device 200, a DSP circuit 120, a display unit 130, an operation unit 140, a bus 150, a power supply unit 160, a recording unit 170, and a frame memory 180. As the imaging apparatus 100, an information processing apparatus or a smartphone having an imaging function, a digital camera, or the like is supposed.

The optical unit 110 collects incident light from a subject and guides the collected incident light to the solid-state imaging device 200. The optical unit 110 is constituted by, for example, a plurality of lenses, a diaphragm, a shutter, and the like.

The solid-state imaging device 200 photoelectrically converts incident light to capture image data. This solid-state imaging device 200 supplies the generated image data (frame) to the DSP circuit 120.

The DSP circuit 120 executes a predetermined digital signal process on the frame from the solid-state imaging device 200. For example, a variety of digital signal processes including a demosaic process, a white balance process, a filter process, and the like are executed. In these processes, the DSP circuit 120 causes the frame memory 180 to hold the frame as necessary. Then, the DSP circuit 120 outputs the processed frame to the display unit 130 and the recording unit 170.

The display unit 130 displays a frame or the like. The operation unit 140 generates an operation signal in accordance with a user's operation.

The bus 150 is a common path through which the solid-state imaging device 200, the DSP circuit 120, the display unit 130, the operation unit 140, the power supply unit 160, the recording unit 170, and the frame memory 180 exchange data with each other.

The power supply unit 160 supplies power to a circuit in the imaging apparatus 100. The recording unit 170 records a frame. The frame memory 180 holds a frame.

Note that, although the optical unit 110, the solid-state imaging device 200, the DSP circuit 120, the display unit 130, the operation unit 140, the bus 150, the power supply unit 160, the recording unit 170, and the frame memory 180 are provided in the same apparatus, these members may be provided in a plurality of apparatuses in a dispersed manner. For example, the optical unit 110 and the solid-state imaging device 200 may be arranged in the imaging apparatus, while the DSP circuit 120 and the like may be arranged in an information processing apparatus.

[Configuration Example of Solid-State Imaging Device]

Figure 2:
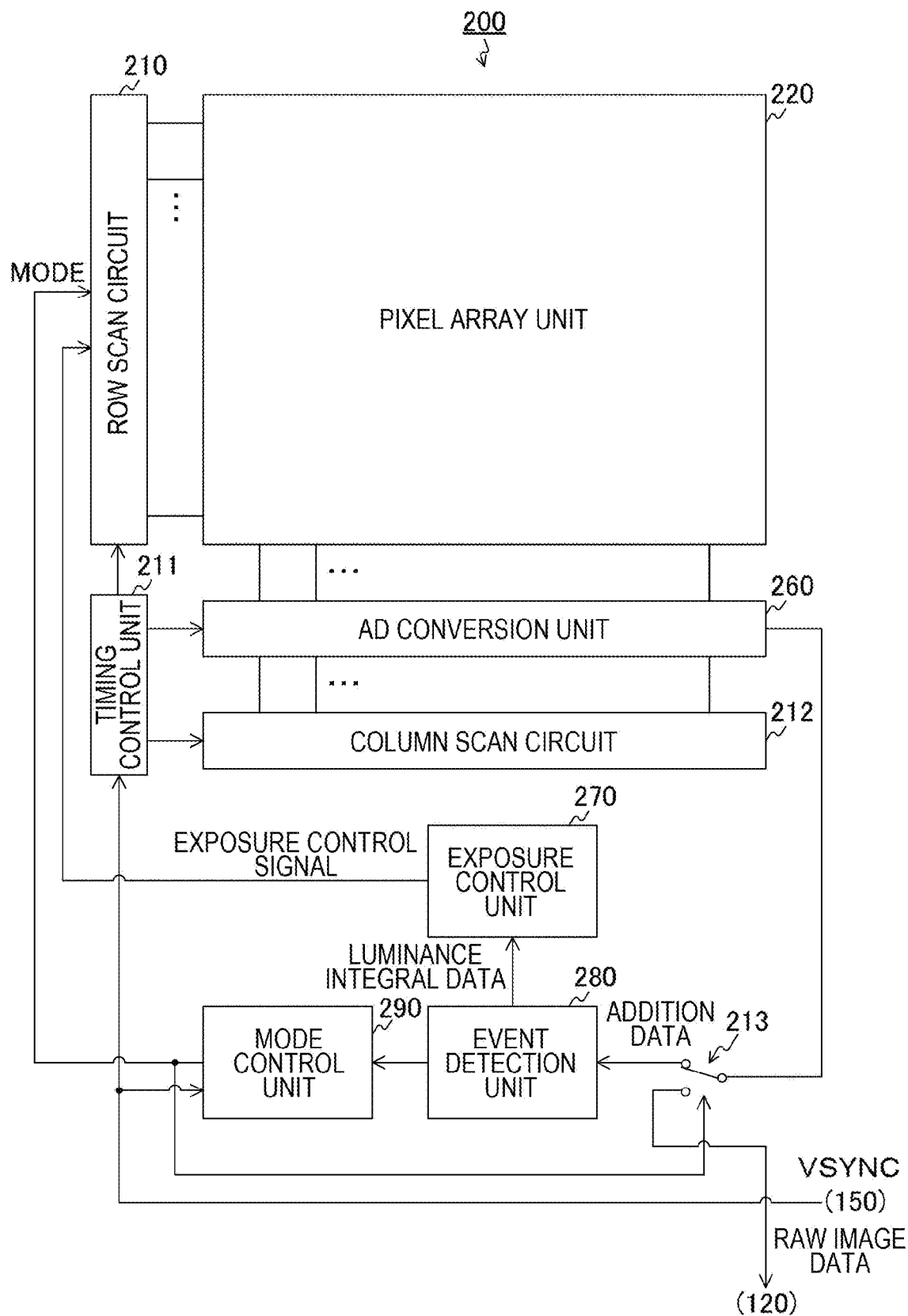
FIG. 2 is a block diagram illustrating a configuration example of a solid-state imaging device according to the first embodiment of the present technology.

FIG. 2 is a block diagram illustrating a configuration example of the solid-state imaging device 200 according to the first embodiment of the present technology. This solid-state imaging device 200 includes a row scan circuit 210, a pixel array unit 220, a timing control unit 211, an AD conversion unit 260, a column scan circuit 212, a switch 213, an exposure control unit 270, an event detection unit 280, and a mode control unit 290.

Furthermore, in the pixel array unit 220, a plurality of pixels is laid out in a two-dimensional lattice pattern. Hereinafter, a group of pixels laid out in a predetermined direction (e.g., horizontal direction) is referred to as "row" and a group of pixels laid out in a direction perpendicular to the row is referred to as "column".

The timing control unit 211 controls action timings of the row scan circuit 210, the AD conversion unit 260, and the column scan circuit 212. A vertical synchronization signal VSYNC of a predetermined frequency $f_{VSYNC}$ (e.g., 30 hertz) is input to this timing control unit 211 via the bus 150. This vertical synchronization signal VSYNC is generated by a phase locked loop (not illustrated), the DSP circuit 120, or the like.

The timing control unit 211 generates timing signals indicating the respective action timings of the row scan circuit 210, the AD conversion unit 260, and the column scan circuit 212 in synchronization with the vertical synchronization signal VSYNC and supplies the corresponding timing signals to each member.

The row scan circuit 210 drives the pixel to generate an analog signal at a level according to the exposure amount. An exposure control signal and a mode signal MODE are input to this row scan circuit 210. The exposure control signal is a signal for controlling the exposure time. Meanwhile, the mode signal MODE is a signal indicating one of a pixel addition mode in which pixel addition is performed or a normal mode in which pixel addition is not performed.

In the pixel addition mode, the row scan circuit 210 controls the pixel array unit 220 to generate an analog addition signal by pixel addition. Meanwhile, in the normal mode, the row scan circuit 210 controls the pixel array unit 220 to generate an analog pixel signal for each pixel. Note that the row scan circuit 210 is an example of a scan circuit described in the claims.

The AD conversion unit 260 performs AD conversion on the analog signal (the addition signal or the pixel signal) from the pixel array unit 220. The AD conversion unit 260 performs AD conversion on the addition signal to generate addition data and performs AD conversion on the pixel signal to generate pixel data. Then, the AD conversion unit 260 supplies the generated data (the addition data or the pixel data) to the switch 213.

Here, the number of pieces of the addition data generated within the cycle of $1/f_{VSYNC}$ is defined by the resolution and an addition unit of the image data. For example, in a case where the number of rows is I, the number of columns is J, and addition is performed every eight pixels, the number M of pieces of the addition data generated within an imaging interval T ($=1/f_{VSYNC}$) is expressed by the following formula. Here, I, J and M are integers. Note that the addition unit is not limited to eight pixels and may be four pixels or the like.

$$M=(I\times J)/8$$

The switch 213 switches the output destination of the data from the AD conversion unit 260 in accordance with the mode signal MODE. In the pixel addition mode, this switch 213 supplies the addition data from the AD conversion unit 260 to the event detection unit 280. Meanwhile, in the normal mode, the switch 213 supplies image data including the pixel data from the AD conversion unit 260 to the DSP circuit 120 as RAW image data.

The event detection unit 280 detects the presence or absence of a predetermined event on the basis of the addition data to generate a detection result DET. For example, the movement of the subject is detected as an event. Furthermore, the event detection unit 280 integrates the M pieces of addition data to supply to the exposure control unit 270 as luminance integral data. This luminance integral data indicates the photometric amount of the entire image.

The exposure control unit 270 controls the exposure amount of the pixel array unit 220 on the basis of the luminance integral data (photometric amount). This exposure control unit 270 translates the luminance integral data into an exposure value EV and works out the exposure time, for example, by the following formula. Then, the exposure control unit 270 generates an exposure control signal for controlling the exposure time to the worked-out time and supplies the generated exposure control signal to the row scan circuit 210.

$$EV=AV+TV$$

In the above formula, AV represents the logarithm of the F value and TV represents the logarithm of the exposure time.

Note that, although the exposure control unit 270 controls the exposure time, the diaphragm may be controlled instead of the exposure time.

The mode control unit 290 sets one of the pixel addition mode and the normal mode. When a predetermined operation is made by the user, this mode control unit 290 first sets the mode signal MODE with the pixel addition mode. This mode signal MODE is supplied to the row scan circuit 210 and the switch 213.

Then, when a predetermined event occurs during the set pixel addition mode, the mode control unit 290 sets the mode signal MODE with the normal mode. Next, when a certain number of pieces of image data is captured during the normal mode, the mode control unit 290 sets the mode signal MODE with the pixel addition mode.

As described earlier, in the normal mode, since AD conversion is performed for each pixel, the number of times of AD conversion is obtained by I×J times. On the other hand, in the pixel addition mode, AD conversion is performed for every addition unit of pixel addition. Therefore, the number of times of AD conversion required in the case of addition every eight pixels is only (M×N)/8 times. Furthermore, in the normal mode, an image process is executed by the DSP circuit 120 at the post stage but, in the pixel addition mode, the addition data is not output to the DSP circuit 120 and the image process is not performed. Since the number of times of AD conversion is small and the processing amount for image process is decreased as described above, the power consumption of the imaging apparatus 100 in the pixel addition mode is reduced as compared with the normal mode.

Then, the imaging apparatus 100 works in the pixel addition mode until an event is detected and shifts to the normal mode when an event is detected. For this reason, the power consumption of the imaging apparatus 100 can be reduced as compared with a case where the imaging apparatus 100 always works without pixel addition (in other words, in the normal mode) regardless of the presence or absence of an event.

For example, it is assumed that the power consumption in the pixel addition mode is 1.5 milliwatts (mW) per hour and the power consumption in the normal mode is 34.8 milliwatts (mW) per hour. Furthermore, it is assumed that the frequency $f_{VSYNC}$ of the vertical synchronization signal VSYNC is 30 hertz (Hz) and 60 pieces of image data are captured in one hour in the normal mode. In this case, the power consumption of the imaging apparatus 100 per hour can be worked out by the following formula.

$$34.8 \text{ (mW)} \times 60/\{30 \text{ (Hz)} \times 3600 \text{ (seconds)}\} + 1.5 \text{ (mW)} \times (30 \times 3600 - 60)/\{30 \text{ (Hz)} \times 3600 \text{ (seconds)}\} \approx 1.52 \text{ (mW)}$$

In this manner, compared with the value (34.8 mW) in the case of working always in the normal mode, the power consumption can be greatly reduced.

[Configuration Example of Pixel Array Unit]

Figure 3:
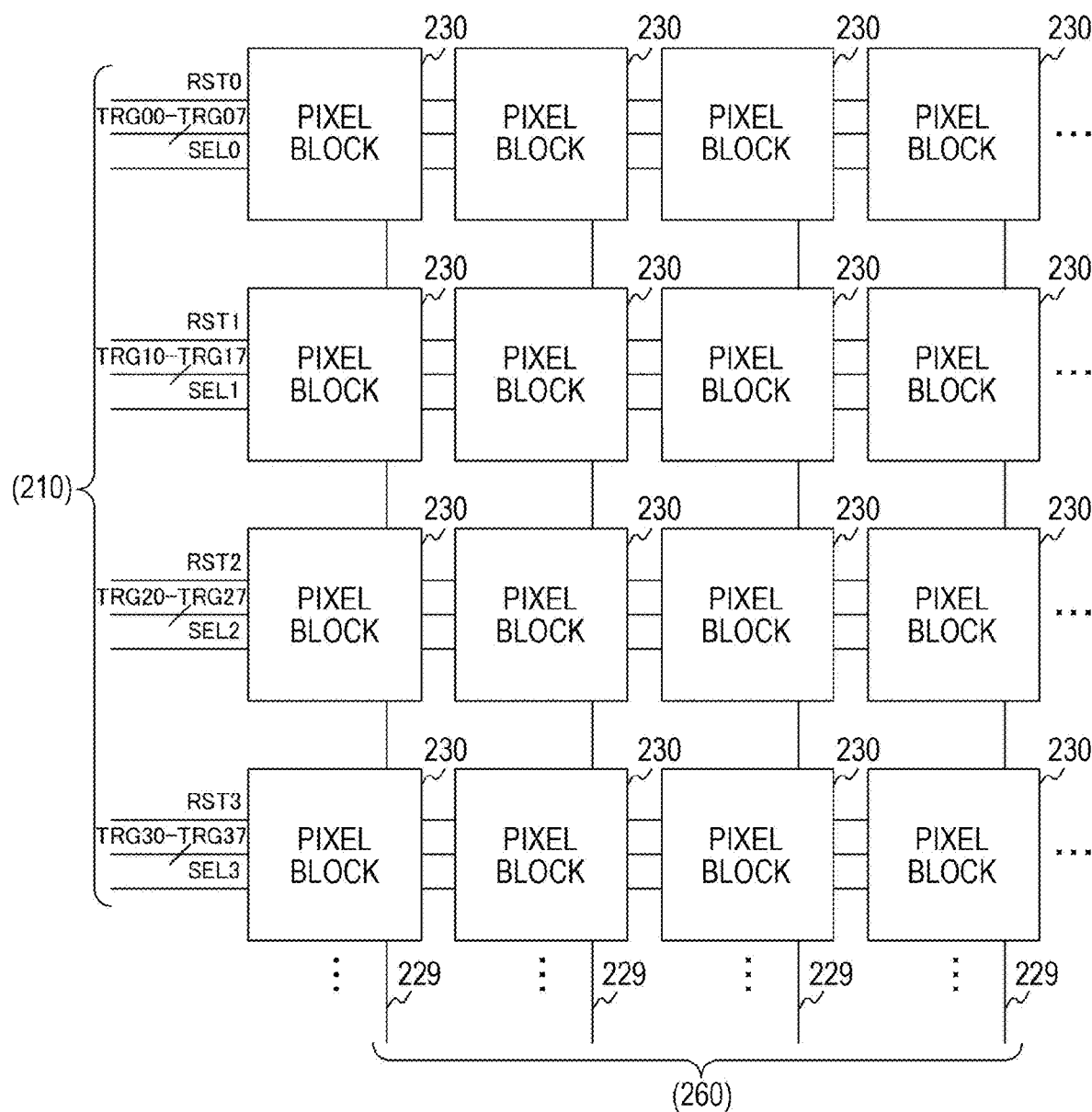
FIG. 3 is a plan view illustrating a configuration example of a pixel array unit according to the first embodiment of the present technology.

FIG. 3 is a plan view illustrating a configuration example of the pixel array unit 220 according to the first embodiment of the present technology. In this pixel array unit 220, a plurality of pixel blocks 230 are laid out in a two-dimensional lattice pattern. Each pixel block 230 is provided with a plurality of pixels (e.g., eight pixels).

Hereinafter, a group of pixel blocks 230 laid out in a predetermined direction (e.g., horizontal direction) is referred to as "block row" and a group of pixel blocks 230 laid out in a direction perpendicular to the block row is referred to as "block column".

Furthermore, ten horizontal signal lines are wired for each block row and one vertical signal line 229 is wired for each block column. One of the ten horizontal signal lines for each row transmits a reset signal RSTi (i is an integer from 0 to I−1), another one thereof transmits a selection signal SELi, and the remaining eight signal lines transmit transfer signals TRGi0 to TRGi7.

The horizontal signal line is connected to the pixel blocks 230 in the corresponding block row and the row scan circuit 210. Meanwhile, the vertical signal line 229 is connected to the pixel blocks 230 in the corresponding block column and the AD conversion unit 260.

[Configuration Example of Pixel Block]

Figure 4:
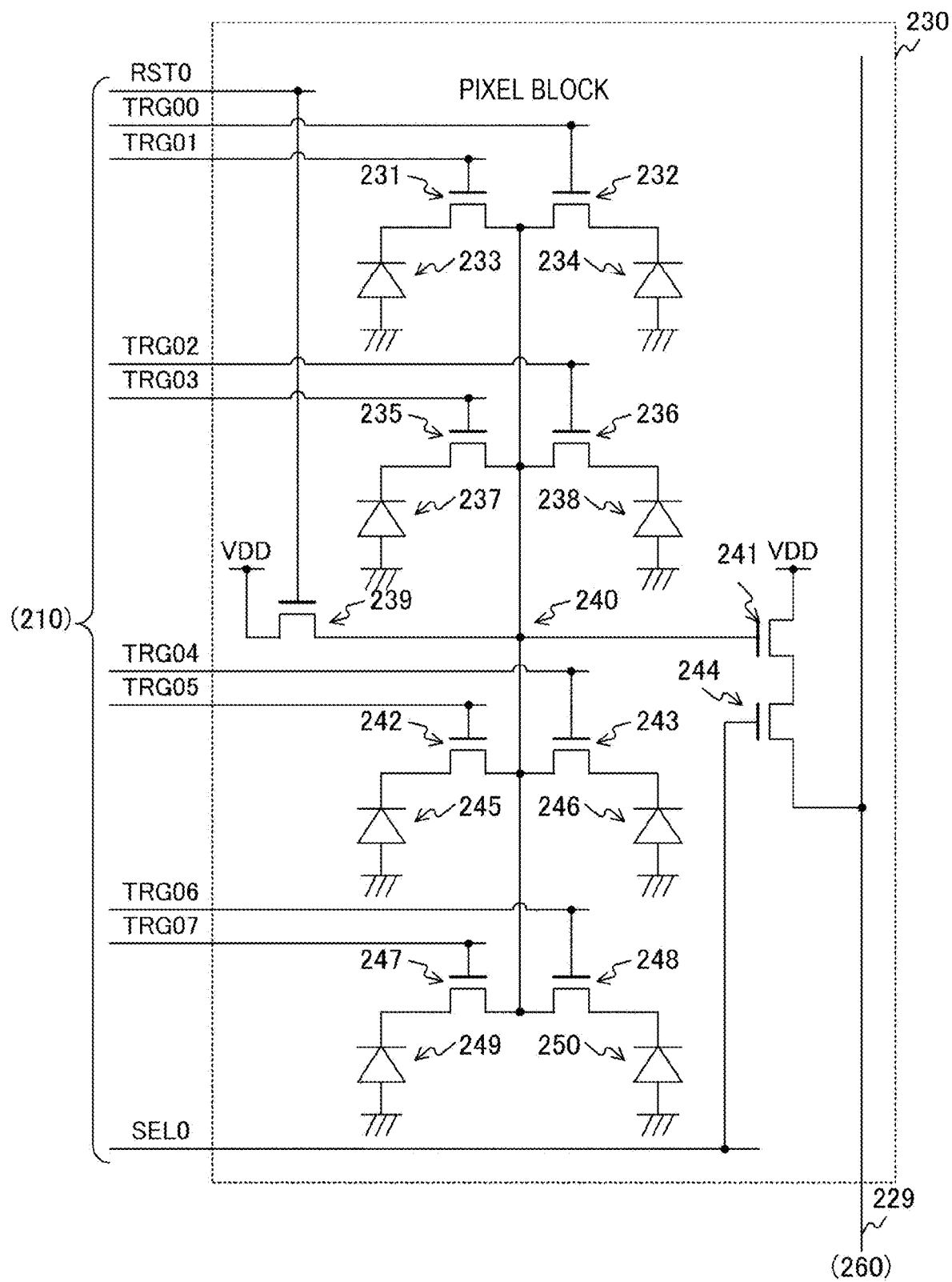
FIG. 4 is a circuit diagram illustrating a configuration example of a pixel block according to the first embodiment of the present technology.

FIG. 4 is a circuit diagram illustrating a configuration example of the pixel block 230 according to the first embodiment of the present technology. This pixel block 230 includes transfer transistors 231, 232, 235, 236, 242, 243, 247, and 248 and photoelectric conversion devices 233, 234, 237, 238, 245, 246, 249, and 250. The pixel block 230 further includes a reset transistor 239, a floating diffusion layer 240, an amplification transistor 241, and a selection transistor 244.

The photoelectric conversion devices 233, 234, 237, 238, 245, 246, 249, and 250 photoelectrically convert incident light to generate charges. These photoelectric conversion devices are connected to mutually different transfer transistors.

The transfer transistors 231, 232, 235, 236, 242, 243, 247 and 248 transfer charges from the corresponding photoelectric conversion devices to the floating diffusion layer 240 in accordance with the transfer signals TRGi0 to TRGi7. The floating diffusion layer 240 accumulates the charges to generate a voltage according to the amount of accumulated charges.

The reset transistor 239 sweeps the charges in the floating diffusion layer 240 to the power supply in accordance with the reset signal RSTi to initialize the amount of charges.

The amplification transistor 241 amplifies a signal of the voltage from the floating diffusion layer 240. The selection transistor 244 outputs the signal amplified by the amplification transistor 241 to the vertical signal line 229 as a pixel signal in accordance with the selection signal SELi.

In the normal mode, the row scan circuit 210 sequentially selects rows of pixels and supplies the reset signal RSTi corresponding to the selected row to start exposure of the row. Furthermore, the row scan circuit 210 supplies the selection signal SELi corresponding to the selected row. Then, when the set exposure time has elapsed, the row scan circuit 210 supplies the corresponding transfer signal TRG0$i$ to terminate the exposure. Each exposure action for the row is started when a certain period of time has elapsed from the previous row.

Meanwhile, in the pixel addition mode, the row scan circuit 210 sequentially selects block rows and supplies the reset signal RSTi corresponding to the selected block row, to start exposure of the block row. Furthermore, the row scan circuit 210 supplies the selection signal SELi corresponding to the selected block row. Then, when the set exposure time has elapsed, the row scan circuit 210 supplies the transfer signal TRG0$i$ corresponding to the selected block row, to terminate the exposure. Each exposure action for the block row is started when a certain period of time has elapsed from the previous block row. Through this control, pixel addition is performed in units of the pixel block 230 (eight pixels).

As described above, in the normal mode, exposure is performed sequentially in units of rows of pixels, whereas in the pixel addition mode, exposure is performed sequentially in units of block rows.

[Configuration Example of Event Detection Unit]

Figure 5:
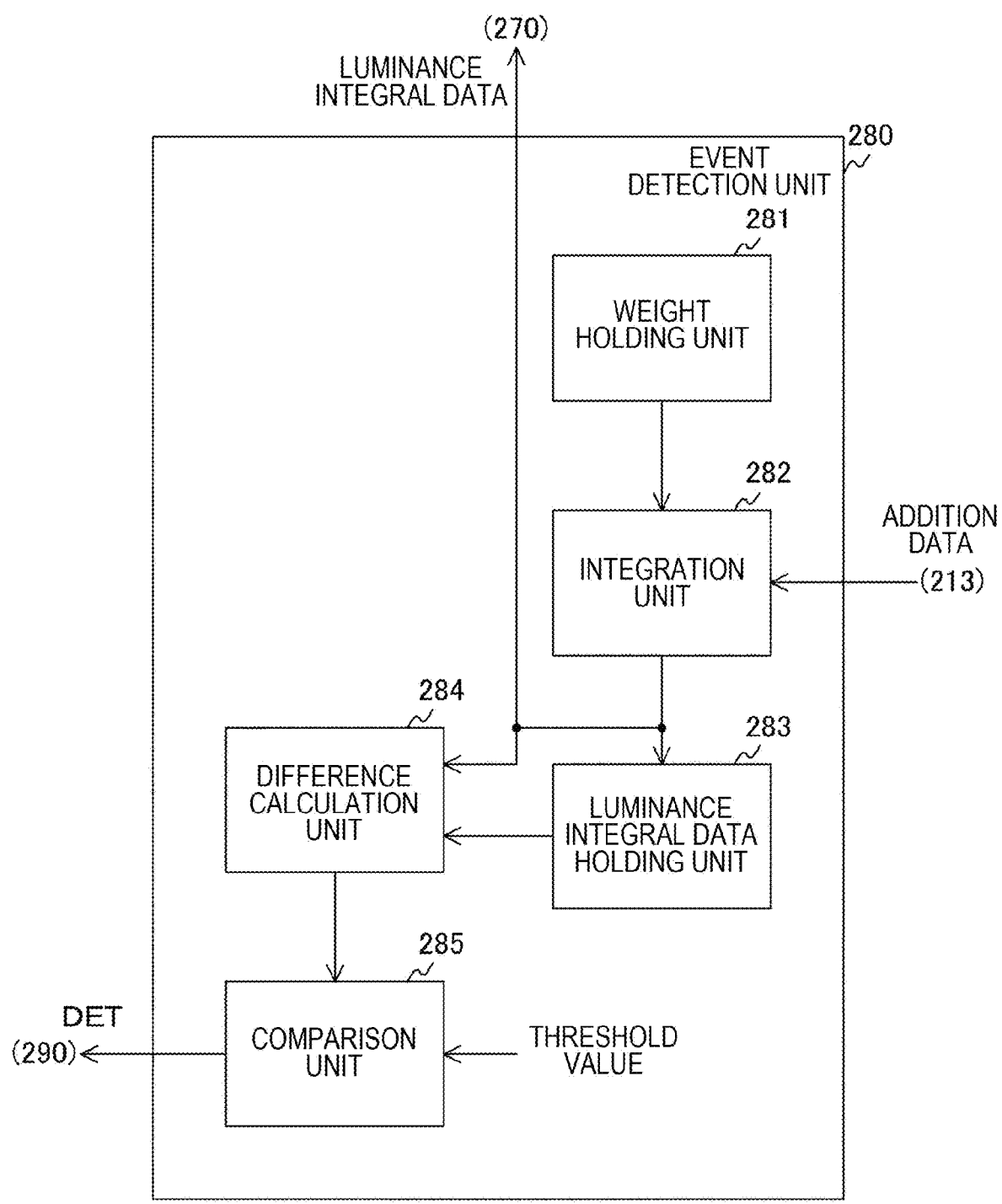
FIG. 5 is a block diagram illustrating a configuration example of an event detection unit according to the first embodiment of the present technology.

FIG. 5 is a block diagram illustrating a configuration example of the event detection unit 280 according to the first embodiment of the present technology. This event detection unit 280 includes a weight holding unit 281, an integration unit 282, a luminance integral data holding unit 283, a difference calculation unit 284, and a comparison unit 285.

The weight holding unit 281 holds a weight for multiplying one piece of the addition data for each piece of the addition data. For example, a weight having a larger value than those of the surroundings is set for a piece of the addition data near the center. Photometry with such setting is called center-weighted metering. Note that the imaging apparatus 100 may perform photometry of a technique other than the center-weighted metering, such as multi-zone metering or spot metering.

The integration unit 282 integrates the N pieces of addition data. In the integration, the integration unit 282 reads the weights from the weight holding unit 281 and performs weighted addition according to the settings of the user. The integration unit 282 supplies data subjected to the weighted addition as luminance integral data to the difference calculation unit 284, the luminance integral data holding unit 283, and the exposure control unit 270.

The luminance integral data holding unit 283 holds the luminance integral data as past luminance integral data.

The difference calculation unit 284 calculates a difference between the current luminance integral data from the integration unit 282 and the past luminance integral data from the luminance integral data holding unit 283. The difference calculation unit 284 supplies the calculated difference to the comparison unit 285.

The comparison unit 285 compares the difference with a predetermined threshold value. This comparison unit 285 supplies the comparison result to the mode control unit 290 as a detection result DET. For example, in a case where the difference exceeds the threshold value, it is detected that there has been movement in the subject (in other words, there has been an event) and, in a case where the difference does not exceed the threshold value, it is detected that there is no movement in the subject. Note that the comparison unit 285 is an example of a movement detection unit described in the claims.

In addition, although the weight holding unit 281 and the integration unit 282 are arranged in the event detection unit 280, these members may be arranged in the exposure control unit 270. In this case, the event detection unit 280 receives the luminance integral data from the exposure control unit 270.

Furthermore, although the event detection unit 280 detects the presence or absence of movement of the subject from the difference between the current luminance integral data and the past luminance integral data, the event detection unit 280 is not limited to this configuration. For example, the event detection unit 280 may detect the presence or absence of movement of the subject using a background subtraction method in which N pieces of the addition data are acquired as a frame without integrating these pieces of the addition data and compared with a background frame, or a frame subtraction method in which past frames and the current frame are compared, or the like.

Furthermore, although the event detection unit 280 detects the movement of the subject as an event, the event to be detected is not limited to the movement of the subject as long as the event can be detected using the addition data. For example, the event detection unit 280 may perform image recognition to detect the presence or absence of a specific object such as a person.

Furthermore, the mode control unit 290 may shift the mode to the pixel addition mode when the event detection unit 280 detects that there is no movement in the imaging apparatus 100. Alternatively, the event detection unit 280 may focus on a part of the image instead of the entire image to detect the presence or absence of a change in this part of the image. In addition, the event detection unit 280 may detect the presence or absence of a change in a specific color by integrating luminance data for each color. Alternatively, the event detection unit 280 may work out the moving speed of a moving body by the background subtraction method, the frame subtraction method, or the like, to detect whether or not the worked-out speed exceeds a certain speed.

[Configuration Example of Mode Control Unit]

Figure 6:
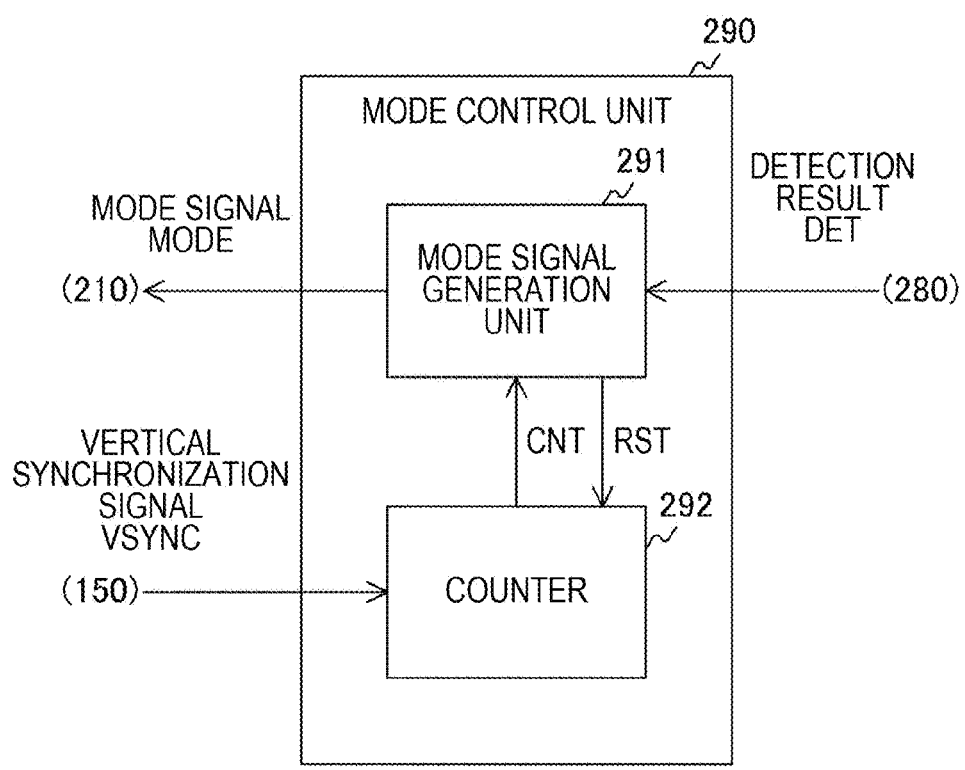
FIG. 6 is a block diagram Illustrating a configuration example of a mode control unit according to the first embodiment of the present technology.

FIG. 6 is a block diagram illustrating a configuration example of the mode control unit 290 according to the first embodiment of the present technology. This mode control unit 290 includes a mode signal generation unit 291 and a counter 292.

The counter 292 counts a counter value CNT in synchronization with the vertical synchronization signal VSYNC. Furthermore, the counter 292 alters the counter value CNT to an initial value in accordance with the reset signal RST.

The mode signal generation unit 291 generates the mode signal MODE on the basis of the detection result DET and the counter value CNT. This mode signal generation unit 291 supplies the generated mode signal MODE to the row scan circuit 210 and the switch 213.

FIG. 7 is a diagram illustrating an example of the action of the mode signal generation unit 291 according to the first embodiment of the present technology. As the mode signal MODE, for example, "0" is set in the pixel addition mode and "1" is set in the normal mode. Furthermore, in the detection result DET, for example, "0" is set in a case where there is no event and "1" is set in a case where an event occurs.

When the detection result DET becomes "1" (there is an event) while the mode signal MODE is "0" (pixel addition mode), the mode signal generation unit 291 sets "1" (normal mode) to the mode signal MODE and initializes the counter value CNT to "0".

Furthermore, when the counter value CNT becomes equal to or greater than N (N is an integer) while the mode signal MODE is "1" (normal mode), the mode signal generation unit 291 sets "0" (pixel addition mode) to the mode signal MODE. Note that the solid-state imaging device 200 shifts from the normal mode to the pixel addition mode when the counter value CNT is N (in other words, when N images are captured), but the solid-state imaging device 200 may shift to the pixel addition mode by a trigger signal from a microcomputer or the like outside the solid-state imaging device 200, instead of the number of captured images. This trigger signal is generated, for example, according to an analysis result for an image captured in the normal mode, an operation by the user, or the like.

Figure 8:
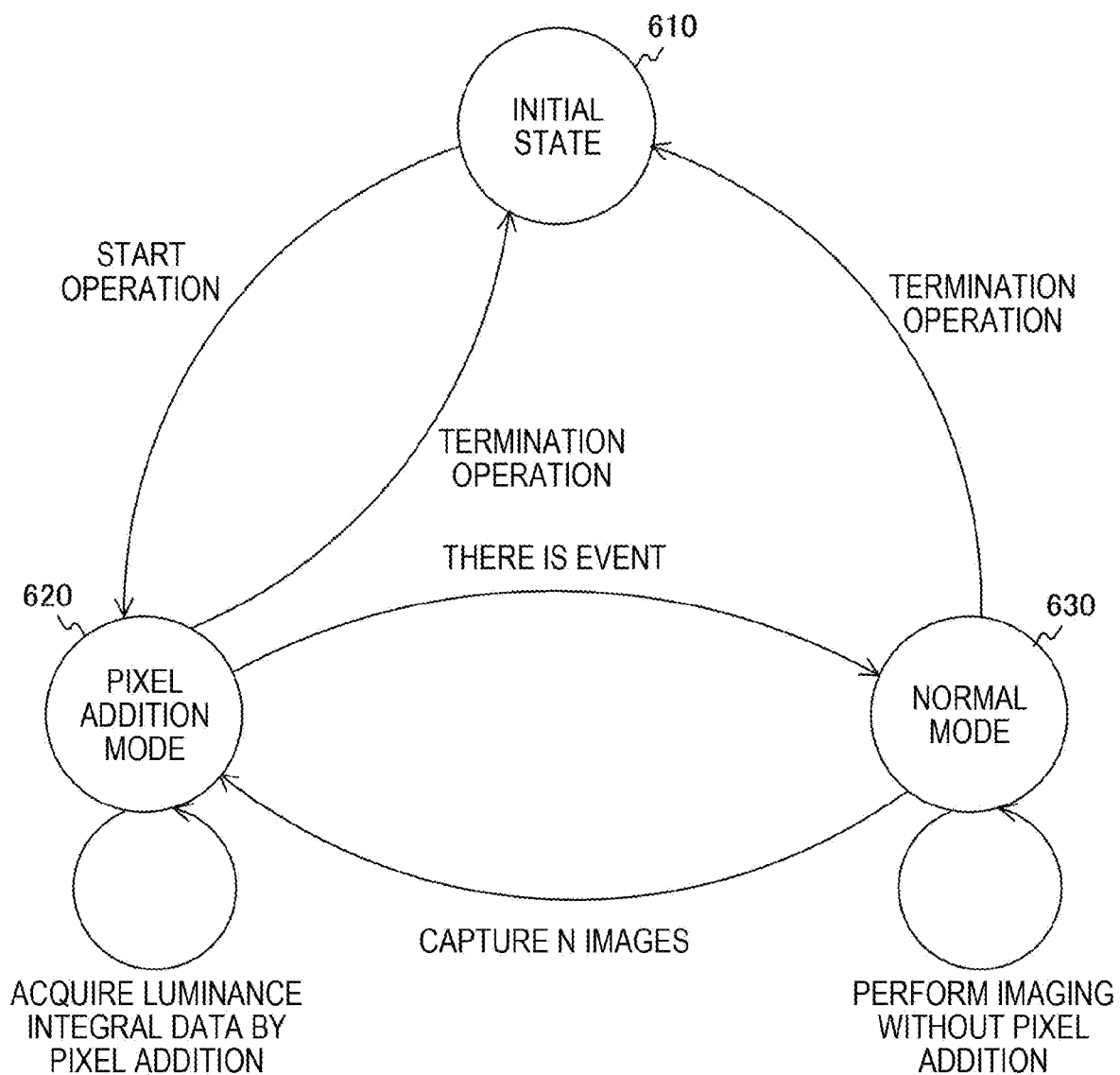
FIG. 8 is an example of a state transition diagram of the imaging apparatus according to the first embodiment of the present technology.

FIG. 8 is an example of a state transition diagram of the imaging apparatus 100 according to the first embodiment of the present technology. The state of the imaging apparatus 100 is classified into three states, namely, an initial state 610, a pixel addition mode 620, and a normal mode 630. The initial state 610 is a state in which the solid-state imaging device 200 is stopped, while the pixel addition mode 620 is a state in which the solid-state imaging device 200 is working and performs pixel addition. Furthermore, the normal mode 630 is a state in which the solid-state imaging device 200 is working and performs imaging without pixel addition.

In the initial state 610, when a start operation for starting a predetermined application is made, the imaging apparatus 100 causes the solid-state imaging device 200 to work and shifts to the pixel addition mode 620.

In the pixel addition mode 620, the imaging apparatus 100 acquires the luminance integral data by pixel addition in synchronization with the vertical synchronization signal VSYNC. Then, the imaging apparatus 100 detects the presence or absence of an event from this luminance integral data. In a case where an event occurs, the imaging apparatus 100 shifts to the normal mode 630.

In the normal mode 630, the imaging apparatus 100 captures image data without pixel addition and, after capturing N images, shifts to the pixel addition mode 620. Furthermore, in the pixel addition mode 620 and the normal mode 630, when a predetermined termination operation for terminating the application is made, the imaging apparatus 100 stops the solid-state imaging device 200 and shifts to the initial state 610.

[Configuration Example of AD Conversion Unit]

Figure 9:
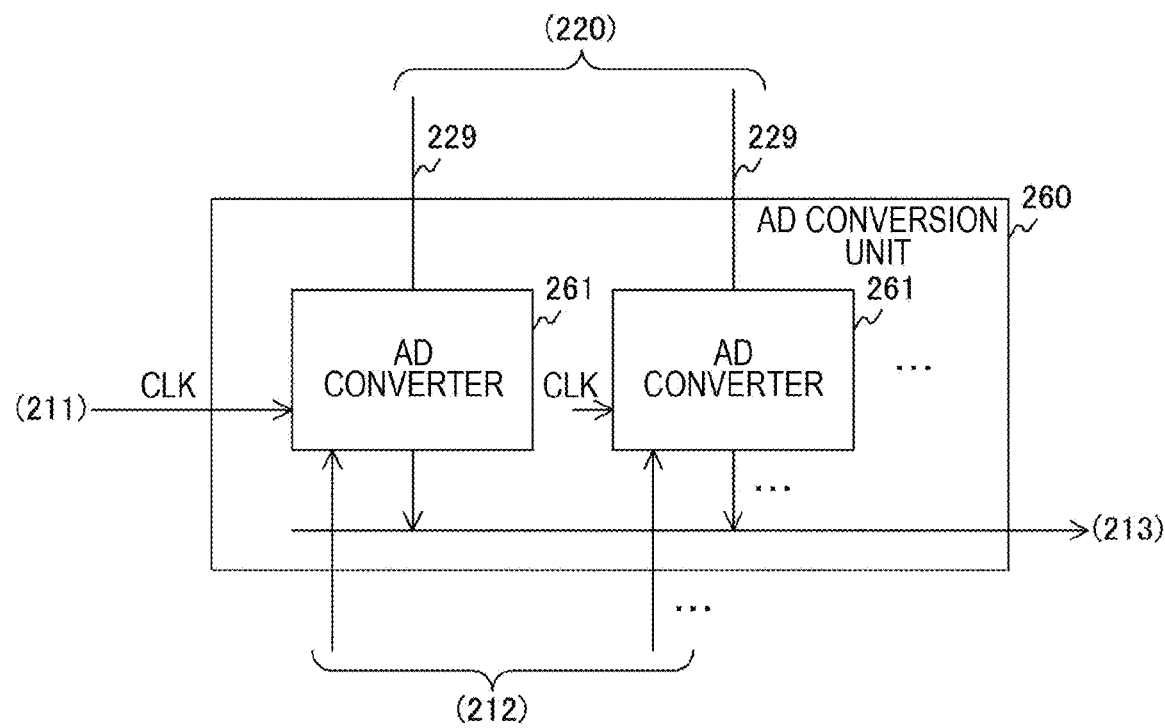
FIG. 9 is a block diagram illustrating a configuration example of an AD conversion unit according to the first embodiment of the present technology.

FIG. 9 is a block diagram illustrating a configuration example of the AD conversion unit 260 according to the first embodiment of the present technology. In this AD conversion unit 260, an AD converter 261 is provided for each block column.

The AD converter 261 acquires analog signals from the corresponding block column via the vertical signal line 229 and performs AD conversion in synchronization with a predetermined clock signal CLK. This AD converter 261 outputs the data subjected to the AD conversion to the switch 213 under the control of the column scan circuit 212.

[Configuration Example of DSP Circuit]

Figure 10:
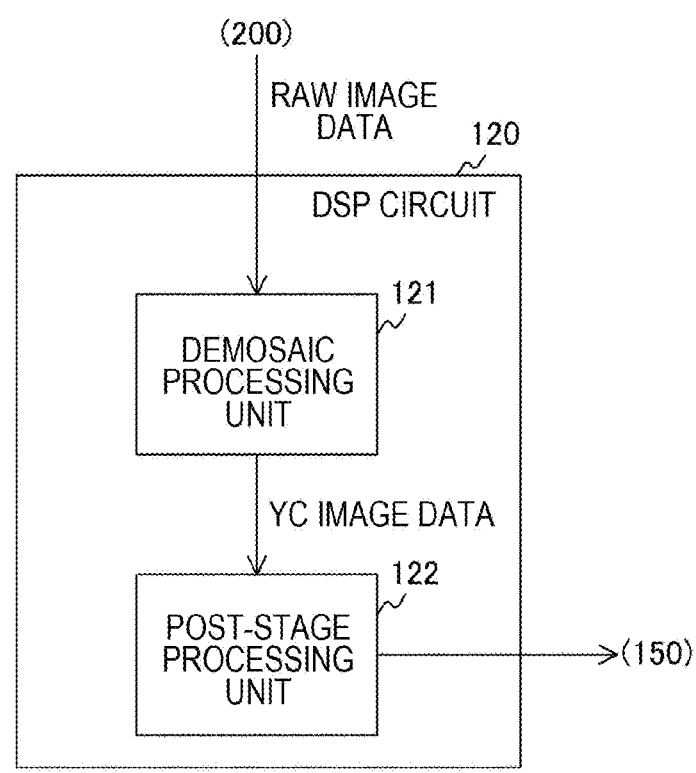
FIG. 10 is a block diagram illustrating a configuration example of a digital signal processing (DSP) circuit according to the first embodiment of the present technology.

FIG. 10 is a block diagram illustrating a configuration example of the DSP circuit 120 according to the first embodiment of the present technology. This DSP circuit 120 includes a demosaic processing unit 121 and a post-stage processing unit 122.

The demosaic processing unit 121 performs a demosaic process on the RAW image data from the solid-state imaging device 200. Here, the demosaic process is a process of interpolating a missing color out of the colors of red (R), green (G), and blue (B) from the periphery of each pixel. The demosaic processing unit 121 supplies image data after the demosaic process to the post-stage processing unit 122 as YC image data.

The post-stage processing unit 122 executes a variety of image processes such as a white balance process and a filter process on the YC image data. This post-stage processing unit 122 outputs the processed YC image data to the display unit 130 and the recording unit 170 via the bus 150.

Figure 11:
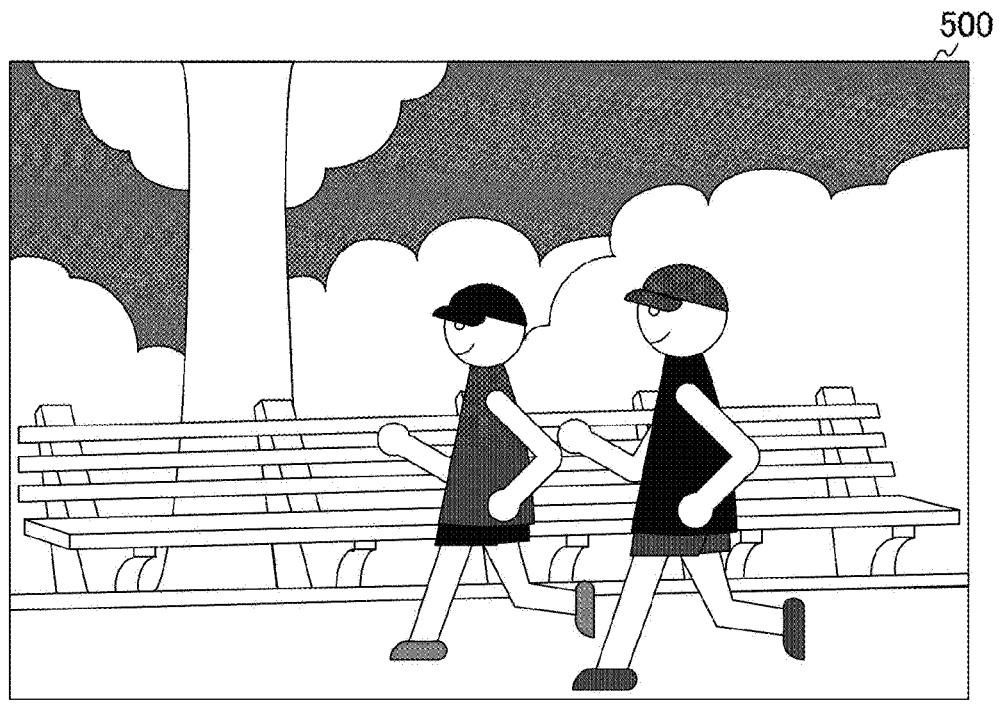
FIG. 11 is a diagram illustrating an example of a subject image according to the first embodiment of the present technology.

FIG. 11 is a diagram illustrating an example of a subject image 500 according to the first embodiment of the present technology. As exemplified in FIG. 11, running persons appear as subjects.

Figure 12:
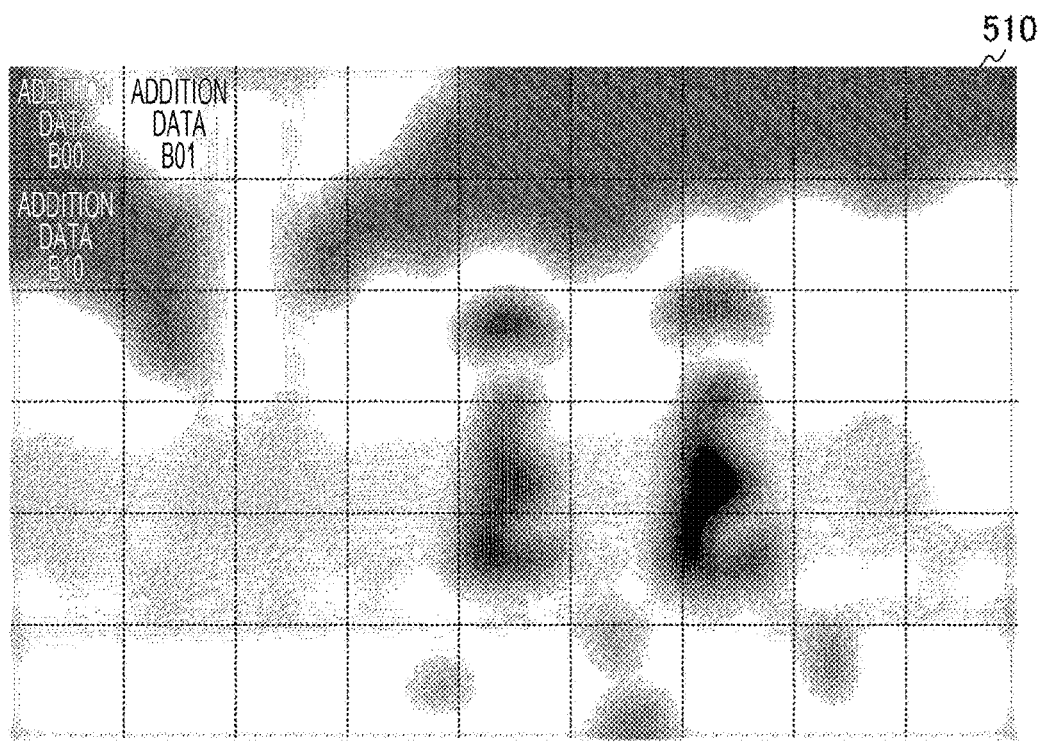
FIG. 12 is a diagram illustrating an example of a distribution of addition data and weights according to the first embodiment of the present technology.
Figure 12:
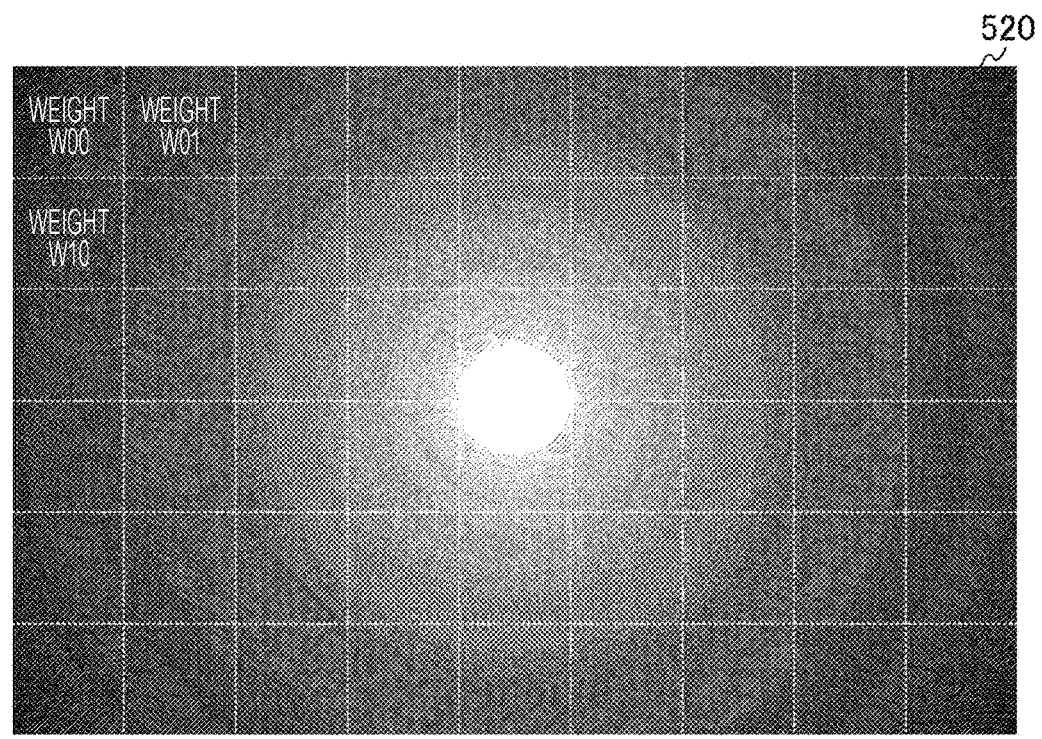

FIG. 12 is a diagram illustrating an example of a distribution of the addition data and the weights according to the first embodiment of the present technology. In FIG. 12, a illustrates an example of luminance distribution data 510 made up of M pieces of the addition data generated from the subject image 500. In FIG. 12, b illustrates an example of a distribution of the weights. Furthermore, each of sections delimited by dotted lines in FIG. 12 indicates an area corresponding to the pixel block.

The solid-state imaging device 200 generates the addition data from the addition signal of one pixel block for each pixel block. For example, addition data B00 is generated from the addition signal of the upper left pixel block and addition data B01 and addition data B10 are generated from the addition signals of two pixel blocks adjacent to the upper left pixel block.

Furthermore, a larger value than those of the surroundings is set as the weight near the center. Then, the luminance integral data is calculated by weighted addition between the addition data and the weight corresponding to this addition data. For example, the addition data B00 is multiplied by a corresponding weight W00. The addition data B01 is multiplied by a weight W01 and the addition data B10 is multiplied by a weight W10.

Figure 13:
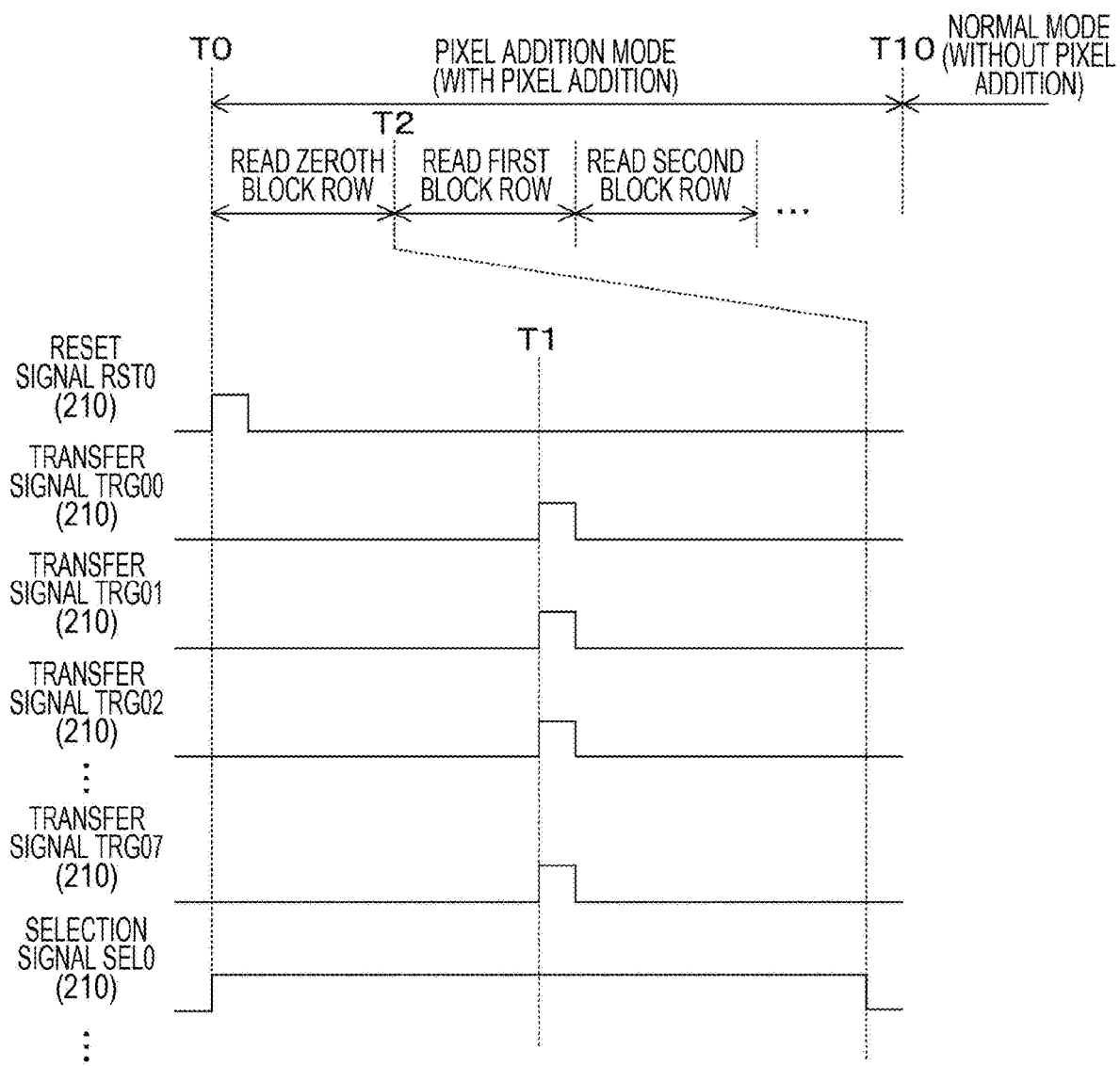
FIG. 13 is a timing chart illustrating an example of the action of the solid-state imaging device in a pixel addition mode according to the first embodiment of the present technology.

FIG. 13 is a timing chart illustrating an example of the action of the solid-state imaging device 200 in the pixel addition mode according to the first embodiment of the present technology. It is assumed that the pixel addition mode is set at a timing T0.

The row scan circuit 210 controls the reset signal RST0 corresponding to a zeroth block row to a high level over a predetermined pulse period. With this control, the exposure of the zeroth block row is started. Then, at a timing T1 when a certain exposure time has elapsed, the row scan circuit 210 controls all of the transfer signals TRG00 to TRG07 corresponding to the zeroth block row to an ON state over the pulse period. With this control, the exposure of the zeroth block row terminated.

Furthermore, the row scan circuit 210 controls the selection signal SEL0 corresponding to the zeroth block row to the ON state during a period from the timing T0 to a timing T2. With this control, the addition signal of the zeroth block row is read.

After the timing T2, exposure and reading of the first and subsequent block rows are sequentially executed. In each block row, exposure and reading are started when a certain period of time has elapsed since exposure and reading of the previous block row. Then, reading of the block rows is executed a plurality of times in synchronization with the vertical synchronization signal VSYNC.

Figure 14:
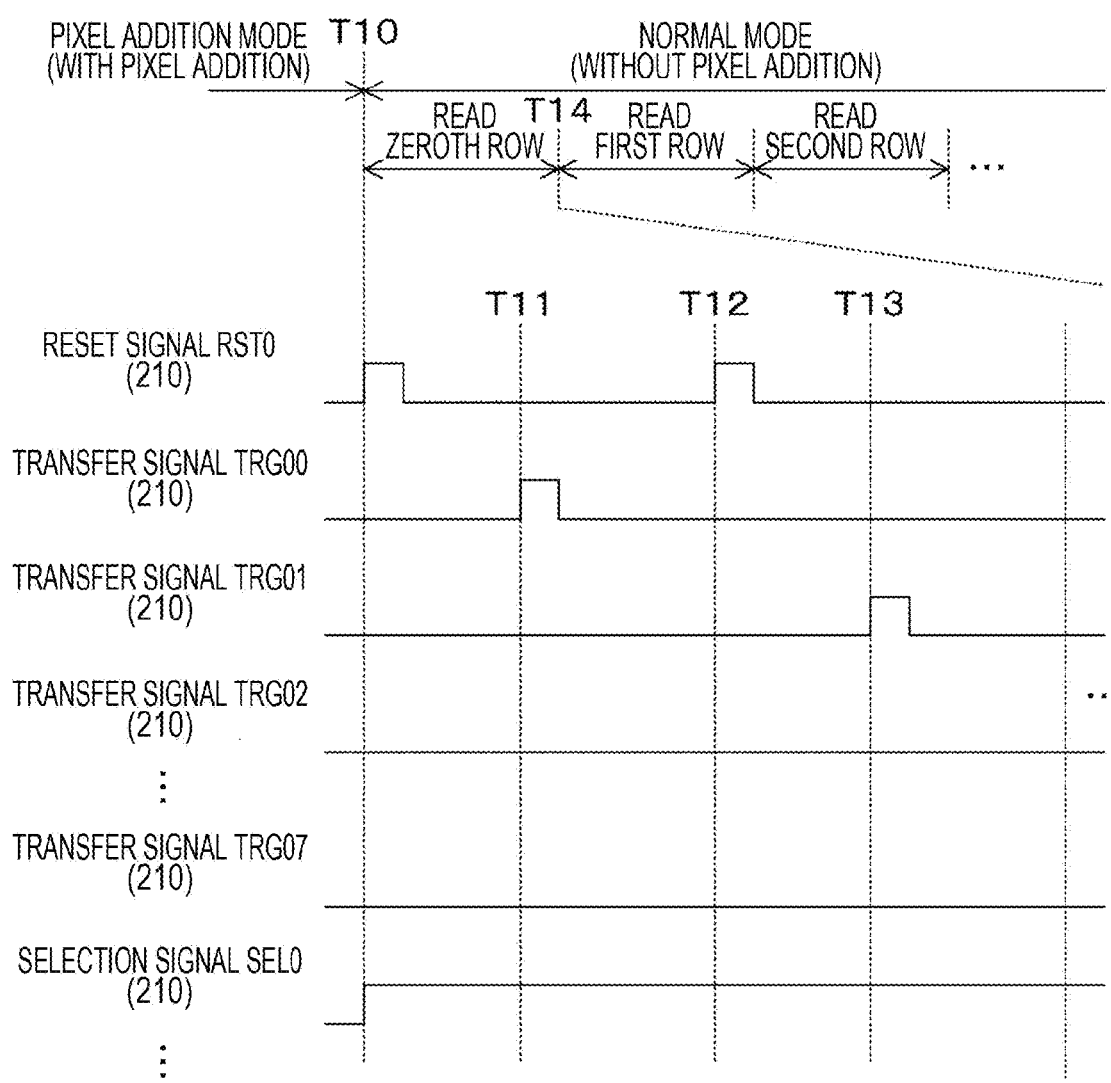
FIG. 14 is a timing chart illustrating an example of the action of the solid-state imaging device in a normal mode according to the first embodiment of the present technology.

FIG. 14 is a timing chart Illustrating an example of the action of the solid-state imaging device 200 in the normal mode according to the first embodiment of the present technology. It is assumed that an event is detected and the normal mode is set at a timing T10 after the timing T0.

The row scan circuit 210 controls the reset signal RST0 corresponding to a zeroth row of pixels to a high level over a predetermined pulse period. With this control, the exposure of some pixels in the zeroth row is started. Then, at a timing T11 when a certain exposure time has elapsed, the row scan circuit 210 controls the transfer signal TRG00 corresponding to the zeroth row to an ON state over the pulse period. With this control, the exposure of the some pixels in the zeroth row is terminated.

Then, at a timing T12, the row scan circuit 210 again controls the reset signal RST0 to the high level over the predetermined pulse period and, at a timing T13 after the exposure period elapses, controls the transfer signal TRG01 to the ON state over the pulse period. With this control, the remaining pixels in the zeroth row are exposed.

Furthermore, the row scan circuit 210 controls the selection signal SEL0 corresponding to the zeroth to third rows to the ON state during a period from the timing T0 until when these rows are read.

After a timing T13, exposure and reading of the first and subsequent rows are sequentially executed. In each row, exposure and reading are started when a certain period of time has elapsed since exposure and reading of the previous row. Then, reading of all the rows is executed a plurality of times in synchronization with the vertical synchronization signal VSYNC.

[Example of Action of Imaging Apparatus]

Figure 15:
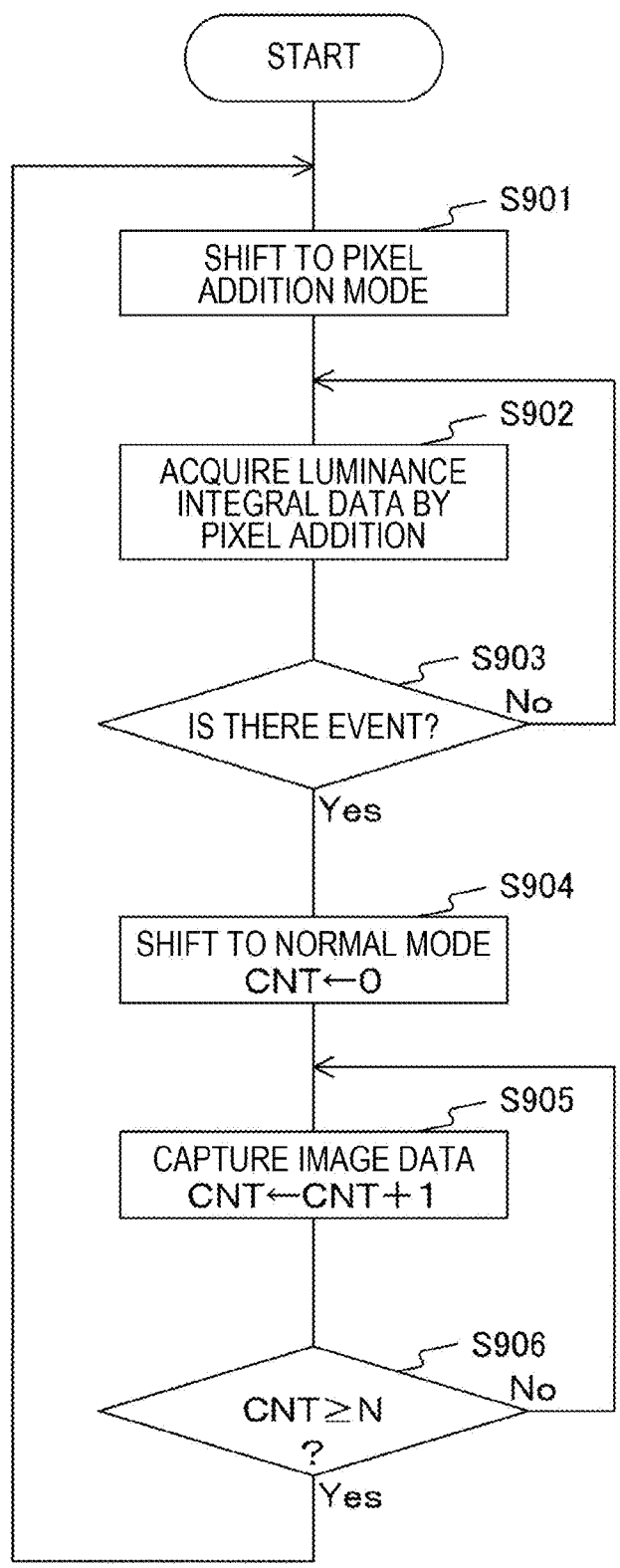
FIG. 15 is a flowchart illustrating an example of the action of the imaging apparatus according to the first embodiment of the present technology.

FIG. 15 is a flowchart illustrating an example of the action of the imaging apparatus 100 according to the first embodiment of the present technology. This action starts, for example, when a predetermined application is executed.

First, the imaging apparatus 100 shifts to the pixel addition mode (step S901) and acquires the luminance integral data by pixel addition (step S902). Then, on the basis of the acquired luminance integral data, the imaging apparatus 100 determines whether or not a predetermined event has occurred (step S903). In a case where no event has occurred (step S903: No), the imaging apparatus 100 repeatedly executes step S902 and the subsequent steps.

On the other hand, in a case where an event has occurred (step S903: Yes), the imaging apparatus 100 shifts to the normal mode and initializes the counter value CNT to "0" (step S904). Then, the imaging apparatus 100 captures the image data without pixel addition and increments the counter value CNT (step S905). The imaging apparatus 100 determines whether or not the counter value CNT is equal to or greater than N (step S906). In a case where the counter value CNT is less than N (step S906: No), the imaging apparatus 100 repeatedly executes step S905 and the subsequent steps.

On the other hand, in a case where the counter value CNT is equal to or greater than N (step S906: Yes), the imaging apparatus 100 repeatedly executes step S901 and the subsequent steps.

As described above, according to the first embodiment of the present technology, since the solid-state imaging device 200 generates the addition data by pixel addition until an event is detected, it is possible to reduce the power consumption as compared with a case where imaging is always performed without pixel addition.

2. Second Embodiment

In the above-described first embodiment, the solid-state imaging device 200 performs exposure control and event detection. However, from the viewpoint of lessening the processing amount of the solid-state imaging device 200, a configuration in which these processes are performed by a member outside the solid-state imaging device 200 (e.g., the DSP circuit 120) may be adopted. Such an imaging apparatus 100 according to a second embodiment is different from that of the first embodiment in that exposure control and event detection are performed by a circuit outside a solid-state imaging device 200.

Figure 16:
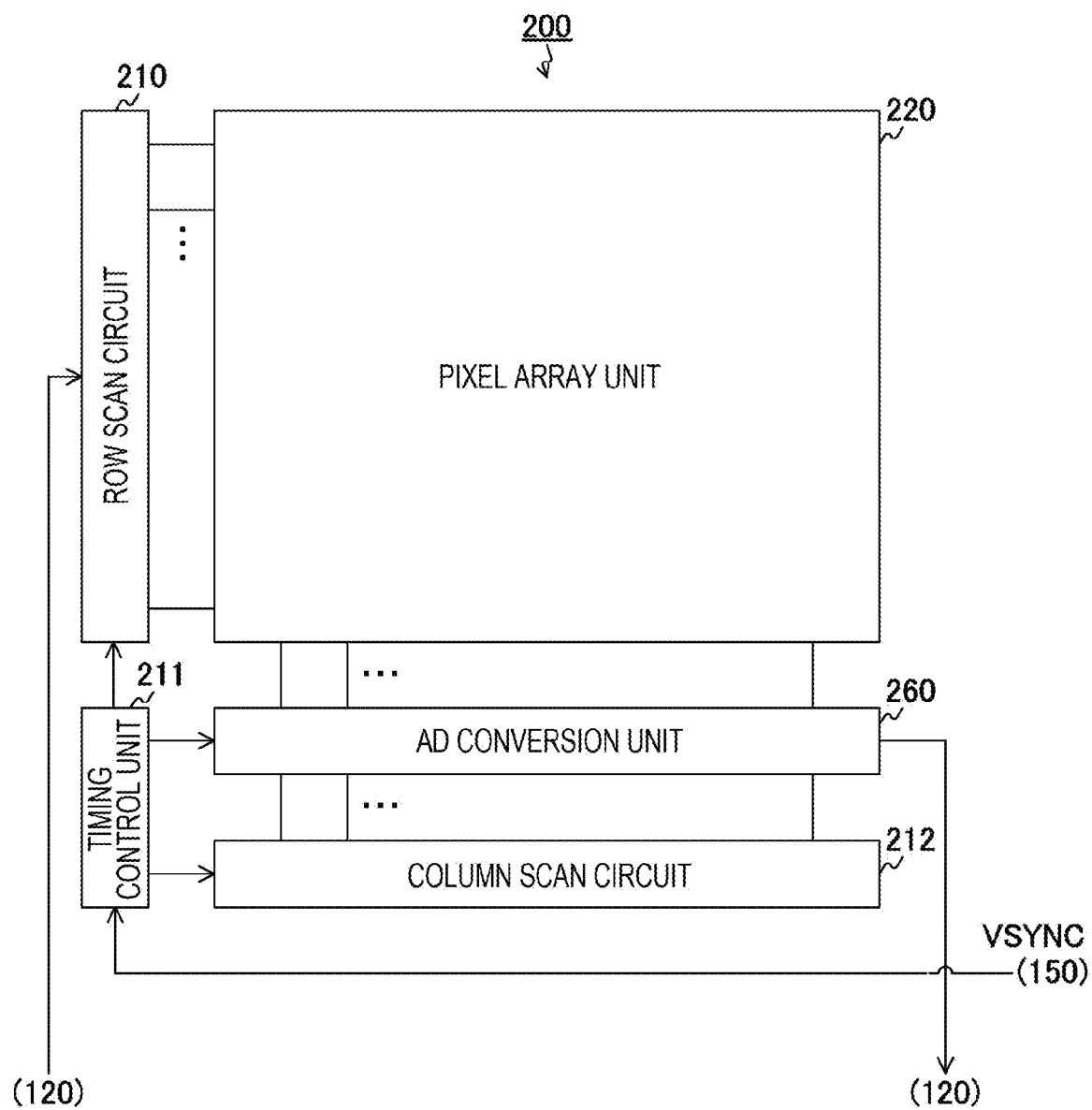
FIG. 16 is a block diagram illustrating a configuration example of a solid-state imaging device according to a second embodiment of the present technology.

FIG. 16 is a block diagram illustrating a configuration example of the solid-state imaging device 200 according to the second embodiment of the present technology. This solid-state imaging device 200 of the second embodiment is different from that of the first embodiment in that the solid-state imaging device 200 does not include the switch 213, the exposure control unit 270, the event detection unit 280, and the mode control unit 290.

Figure 17:
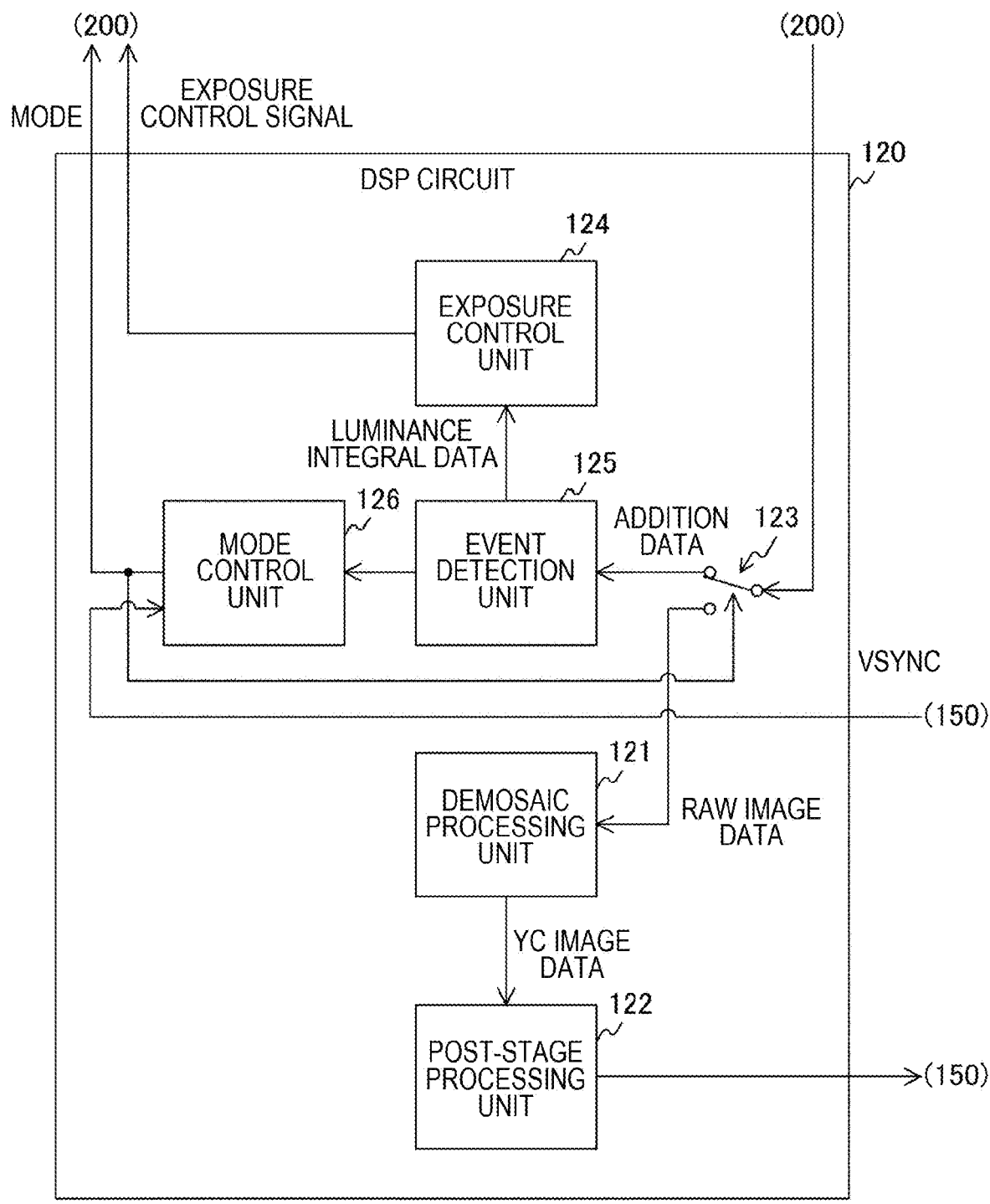
FIG. 17 is a block diagram illustrating a configuration example of a DSP circuit according to the second embodiment of the present technology.

FIG. 17 is a block diagram illustrating a configuration example of a DSP circuit 120 according to the second embodiment of the present technology. This DSP circuit 120 of the second embodiment is different from that of the first embodiment in that the DSP circuit 120 further includes a switch 123, an exposure control unit 124, an event detection unit 125, and a mode control unit 126.

The switch 123, the exposure control unit 124, the event detection unit 125, and the mode control unit 126 in the DSP circuit 120 have similar configurations to those of the switch 213, the exposure control unit 270, the event detection unit 280, and the mode control unit 290 of the first embodiment. Note that, although the exposure control unit 124, the event detection unit 125, and the mode control unit 126 are arranged in the DSP circuit 120, these members may be arranged in a circuit other than the DSP circuit 120 as long as the circuit is located outside the solid-state imaging device 200.

As described above, according to the second embodiment of the present technology, since the exposure control unit 124 and the event detection unit 125 are provided in the DSP circuit 120, the processing amount of the solid-state imaging device 200 can be lessened as compared with a case where these members are provided in the solid-state imaging device 200.

3. Third Embodiment

In the above-described first embodiment, a previously set area (e.g., an area near the center) is intensively photometered. However, in a case where the subject is moving, there is a possibility that an appropriate photometric amount cannot be obtained. In this case, it is desirable to intensively photometer an area where there has been movement of the subject. Such an imaging apparatus 100 according to a third embodiment is different from that of the first embodiment in that an area where the subject has moved is intensively photometered.

Figure 18:
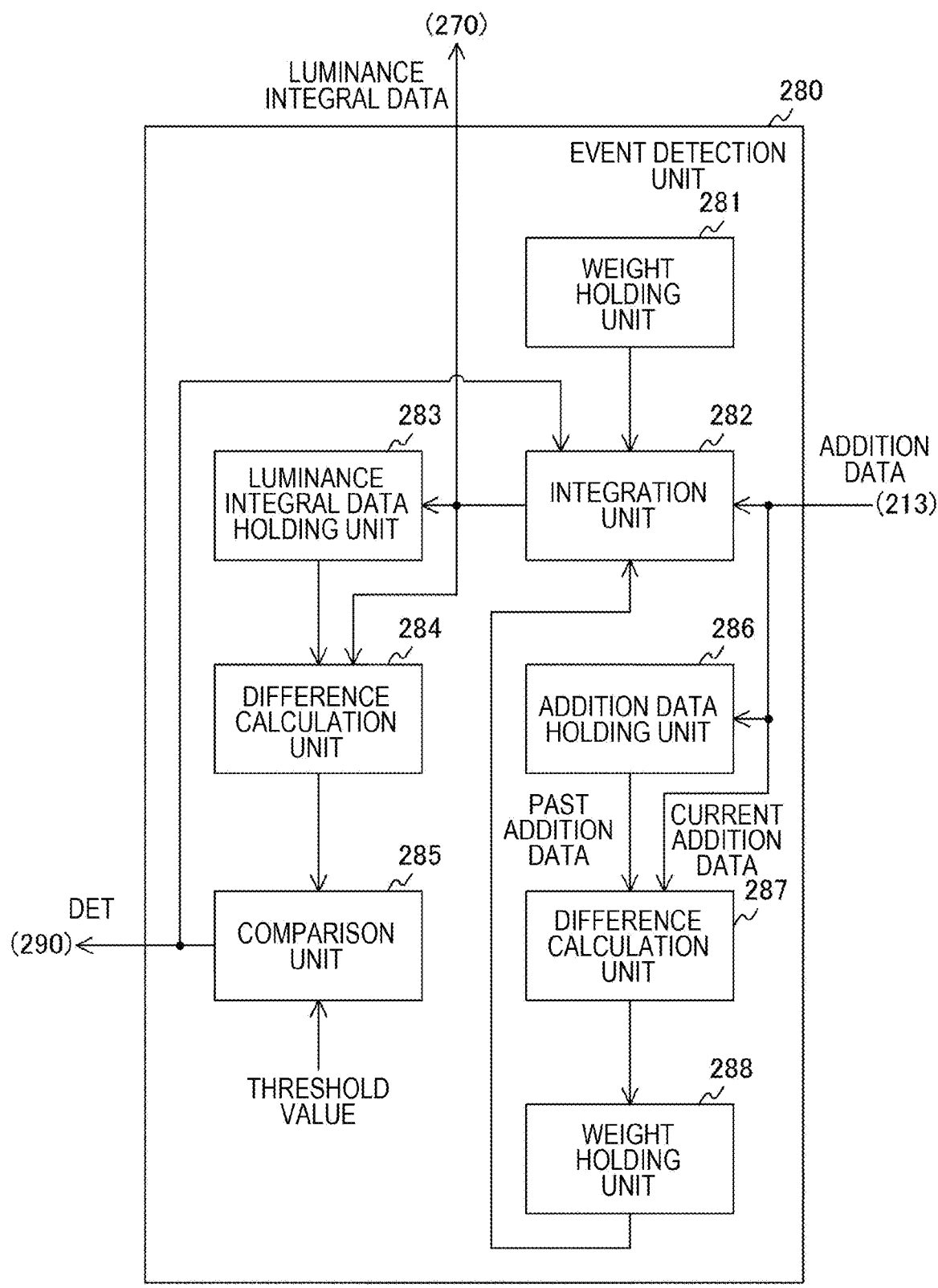
FIG. 18 is a block diagram illustrating a configuration example of an event detection unit according to a third embodiment of the present technology.

FIG. 18 is a block diagram illustrating a configuration example of an event detection unit 280 according to the third embodiment of the present technology. This event detection unit 280 according to the third embodiment is different from that of the first embodiment in that the event detection unit 280 further includes an addition data holding unit 286, a difference calculation unit 287, and a weight holding unit 288.

The addition data holding unit 286 holds M pieces of the addition data as past addition data.

The difference calculation unit 287 calculates a difference between the current addition data from the switch 213 and the corresponding addition data in the addition data holding unit 286 for each pixel block. In a case where the number of pixel blocks is M, M differences are calculated. The difference calculation unit 287 generates a weight having a larger value as the difference is larger (in different terms, the movement is larger) for each pixel block, and holds the generated weight in the weight holding unit 288. The weight holding unit 288 holds the weight generated by the difference calculation unit 287. Note that the difference calculation unit 287 is an example of a difference acquisition unit described in the claims.

Furthermore, an integration unit 282 of the third embodiment performs weighted addition according to the weight in the weight holding unit 281 in the first photometry, and performs weighted addition according to the weight in the weight holding unit 288 in the second and subsequent photometry.

Figure 19:
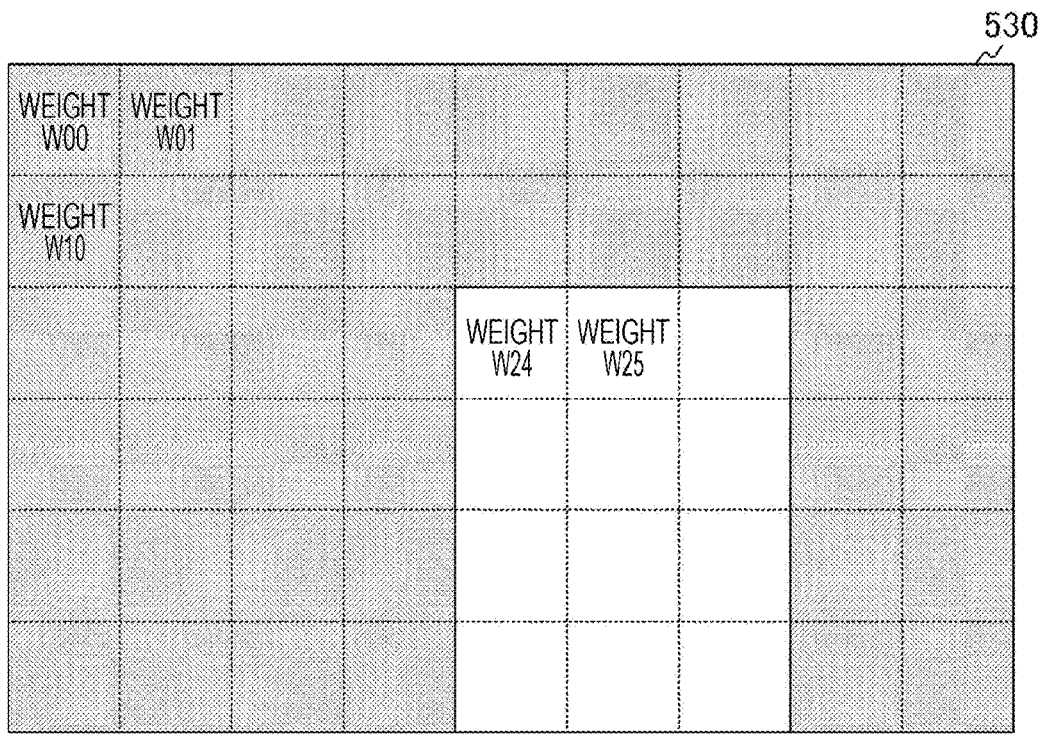
FIG. 19 is a diagram illustrating an example of a distribution of weights according to the third embodiment of the present technology.

FIG. 19 is a diagram illustrating an example of a distribution of the weights according to the third embodiment of the present technology. In FIG. 19, the bright area indicates an area where the subject has moved. The imaging apparatus 100 sets the weight (such as W24) of the area where the subject has moved to a value larger than the weights (such as W00) of the other areas. With this setting, the imaging apparatus 100 can intensively photometer the area where the subject has moved, and control the exposure amount to an appropriate amount.

As described above, according to the third embodiment of the present technology, since the imaging apparatus 100 performs weighted addition using the weight according to the difference between the current addition data and the past addition data, it is possible to intensively photometer an area where the subject has moved.

Note that the above-described embodiments illustrate examples for embodying the present technology and matters in the embodiments and invention specifying matters in the claims individually have correspondence relationships. Likewise, the invention specifying matters in the claims and the matters in the embodiments of the present technology denoted by the same names as those in the claims individually have correspondence relationships. However, the present technology is not limited to the embodiments and can be embodied by subjecting the embodiments to various modifications without departing from the gist thereof.

Furthermore, the process procedures described in the above embodiments may be regarded as a method having these series of procedures and additionally, may be regarded as a program for causing a computer to execute these series of procedures or as a recording medium storing the program. As this recording medium, for example, a compact disc (CD), a mini disc (MD), a digital versatile disc (DVD), a memory card, a Flu-ray (registered trademark) disc, or the like can be used.

Note that the effects described in the present description merely serve as examples and not construed to be limited. There may be another effect as well.

Note that the present technology can be also configured as described below.

(1) An imaging apparatus including:
a pixel array unit provided with a plurality of transfer transistors that transfer the charges from mutually different photoelectric conversion devices to a floating diffusion layer;
a scan circuit that simultaneously controls the plurality of transfer transistors in a pixel addition mode in which pixel addition is performed, to transfer the charges, and sequentially controls the plurality of transfer transistors in a normal mode in which pixel addition is not performed, to transfer the charges;
an event detection unit that detects presence or absence of a predetermined event on the basis of an addition signal which is an analog signal generated in the pixel addition mode, and generates a detection result; and
a mode control unit that sets one of the pixel addition mode and the normal mode on the basis of the detection result.

(2) The imaging apparatus according to (1) above, further including an analog-to-digital conversion unit that performs analog-to-digital conversion on the addition signal to output as addition data.

(3) The imaging apparatus according to (2) above, in which
a predetermined number of the floating diffusion layers is arranged in the pixel array unit,
the imaging apparatus further including an exposure control unit that controls an exposure amount of the pixel array unit on the basis of luminance integral data obtained by integrating the predetermined number of pieces of the addition data.

(4) The imaging apparatus according to (3) above, in which
the event detection unit detects presence or absence of movement of a subject as presence or absence of the predetermined event.

(5) The imaging apparatus according to (4) above, in which
the event detection unit includes:
a luminance integral data holding unit that holds the luminance integral data as past integral data; and
a movement detection unit that detects presence or absence of movement of the subject depending on whether or not a difference between new luminance integral data and the past integral data exceeds a predetermined threshold value.

(6) The imaging apparatus according to (5) above, in which
the event detection unit further includes:
an addition data holding unit that holds the predetermined number of pieces of addition data as past addition data; and
a difference acquisition unit that acquires a difference between new addition data and the past addition data corresponding to the new addition data and generates a weight according to the difference, and
the luminance integral data is a weighted addition value of the addition data and the weight corresponding to the addition data.

(7) The imaging apparatus according to any one of (1) to (6) above, in which
the pixel array unit generates an image signal including the analog signal in the normal mode, and
the mode control unit sets the normal mode in a case where it is detected that the predetermined event has occurred, and sets the pixel addition mode in a case where a certain number of the image signals are generated.

(8) The imaging apparatus according to any one of (1) to (8) above, in which
the pixel array unit, the scan circuit, the event detection unit, and the mode control unit are arranged in a solid-state imaging device.

(9) The imaging apparatus according to any one of (1) to (8) above, in which
the pixel array unit and the scan circuit are arranged in a solid-state imaging device, and
the event detection unit and the mode control unit are arranged outside the solid-state imaging device.

(10) A control method for an imaging apparatus, including:
a scanning procedure of simultaneously controlling a plurality of transfer transistors in a pixel array unit provided with the plurality of transfer transistors that transfer the charges from mutually different photoelectric conversion devices to a floating diffusion layer, in a pixel addition mode in which pixel addition is performed, to transfer the charges, and sequentially controls the plurality of transfer transistors in a normal mode in which pixel addition is not performed, to transfer the charges;
an event detection procedure of detecting presence or absence of a predetermined event on the basis of an addition signal which is an analog signal generated in the pixel addition mode, and generating a detection result; and
a mode control procedure of setting one of the pixel addition mode and the normal mode on the basis of the detection result.

REFERENCE SIGNS LIST

100 Imaging apparatus
110 Optical unit
120 DSP circuit
121 Demosaic processing unit
122 Post-stage processing unit
123, 213 Switch
124, 270 Exposure control unit
125, 280 Event detection unit
126, 290 Mode control unit
130 Display unit
140 Operation unit
150 Bus 160 Power supply unit
170 Recording unit
180 Frame memory
200 Solid-state imaging device
210 Row scan circuit
211 Timing control unit
212 Column scan circuit
220 Pixel array unit
230 Pixel block
231, 232, 235, 236, 242, 243, 247, 248 Transfer transistor
233, 234, 237, 238, 245, 246, 249, 250 Photoelectric conversion device
239 Reset transistor
240 Floating diffusion layer
241 Amplification transistor
244 Selection transistor
260 AD conversion unit
261 AD converter
281, 288 Weight holding unit
282 Integration unit
283 Luminance integral data holding unit
284, 287 Difference calculation unit
285 Comparison unit
286 Addition data holding unit
291 Mode signal generation unit
292 Counter

What is claimed is:

1. An imaging apparatus, comprising:
a pixel array unit having a plurality of pixel blocks provided with a plurality of transfer transistors that transfer charges from mutually different photoelectric conversion devices to a floating diffusion layer for each of the plurality of pixel blocks;
a scan circuit that simultaneously controls the plurality of transfer transistors in a pixel addition mode in which pixel addition is performed, to transfer the charges, and sequentially controls the plurality of transfer transistors in a normal mode in which pixel addition is not performed, to transfer the charges;
an event detection unit that detects a presence or an absence of a predetermined event based on an addition signal which is an analog signal generated in the pixel addition mode and converted to addition data, and generates a detection result;
a mode control unit that sets one of the pixel addition mode and the normal mode based on the detection result;
a luminance integral data holding unit that hold luminance integral data obtained by integrating a predetermined amount of the addition data, as past integral data;
an addition data holding unit that holds the predetermined amount of the addition data as past addition data; and
a difference acquisition unit that acquires a difference between new addition data and the past addition data corresponding to the new addition data and generates a weight according to the difference,
wherein the luminance integral data is a weighted addition value of the addition data and the weight corresponding to the addition data, and
wherein the event detection unit detects a presence or an absence of movement of an object in a past frame to a current frame as the presence or the absence of the predetermined event.

2. The imaging apparatus according to claim 1, further comprising an analog-to-digital conversion unit that performs analog-to-digital conversion on the addition signal to convert the addition signal to the addition data.

3. The imaging apparatus according to claim 2, wherein a predetermined number of floating diffusion layers is arranged in the pixel array unit, and
the imaging apparatus further comprising an exposure control unit that controls an exposure amount of the pixel array unit based on the luminance integral data obtained by integrating the predetermined amount of the addition data.

4. The imaging apparatus according to claim 3, wherein the event detection unit include
a movement detection unit that detects the presence or the absence of the movement of the object depending on whether or not a difference between new luminance integral data and the past integral data exceeds a predetermined threshold value.

5. The imaging apparatus according to claim 1, wherein the pixel array unit generates an image signal including the analog signal in the normal mode, and
the mode control unit sets the normal mode when the predetermined event has occurred, and sets the pixel addition mode when a certain number of the image signals are generated.

6. The imaging apparatus according to claim 1, wherein the pixel array unit, the scan circuit, the event detection unit, and the mode control unit are arranged in a solid-state imaging device.

7. The imaging apparatus according to claim 1, wherein the pixel array unit and the scan circuit are arranged in a solid-state imaging device, and
the event detection unit and the mode control unit are arranged outside the solid-state imaging device.

8. A control method for an imaging apparatus, comprising:
a scanning procedure of simultaneously controlling a plurality of transfer transistors in a pixel array unit having a plurality of pixel blocks provided with the plurality of transfer transistors that transfer the charges from mutually different photoelectric conversion devices to a floating diffusion layer for each of the plurality of pixel blocks, in a pixel addition mode in which pixel addition is performed, to transfer the charges, and sequentially controls the plurality of transfer transistors in a normal mode in which pixel addition is not performed, to transfer the charges;
an event detection procedure of detecting a presence or an absence of a predetermined event based on an addition signal which is an analog signal generated in the pixel addition mode, and generating a detection result;
a mode control procedure of setting one of the pixel addition mode and the normal mode based on the detection result;
a luminance integral data holding procedure of holding the luminance integral data obtained by integrating a predetermined amount of the addition data, as past integral data;
an addition data holding procedure of holding the predetermined amount of the addition data as past addition data; and
a difference acquisition procedure of acquiring a difference between new addition data and the past addition data corresponding to the new addition data and generates a weight according to the difference,
wherein the luminance integral data is a weighted addition value of the addition data and the weight corresponding to the addition data, and wherein the event detection procedure detects a presence or an absence of movement of an object in a past frame to a current frame as the presence or the absence of the predetermined event.

9. The control method for an imaging apparatus according to claim 8, further comprising an analog-to-digital conversion procedure of performing analog-to-digital conversion on the addition signal to convert the addition signal to the addition data.

10. The control method for an imaging apparatus according to claim 9, wherein
a predetermined number of floating diffusion layers is arranged in the pixel array unit, and
further comprising an exposure control procedure of controlling an exposure amount of the pixel array unit based on the luminance integral data obtained by integrating the predetermined amount of the addition data.

11. The control method for an imaging apparatus according to claim 10, wherein
the event detection procedure further includes
a movement detection procedure of detecting the presence or the absence of the movement of the object depending on whether or not a difference between new luminance integral data and the past integral data exceeds a predetermined threshold value.

12. The control method for an imaging apparatus according to claim 8, wherein
the pixel array unit generates an image signal including the analog signal in the normal mode, and
the mode control procedure further including setting the normal mode when the predetermined event has occurred, and setting the pixel addition mode when a certain number of the image signals are generated.

* * * * *